US012716742B2

(12) United States Patent
Lv et al.

(10) Patent No.: US 12,716,742 B2
(45) Date of Patent: Aug. 25, 2026

(54) IMAGE PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Meng Lv, Shenzhen (CN); Zehao Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 18/673,515

(22) Filed: May 24, 2024

(65) Prior Publication Data

US 2024/0310184 A1 Sep. 19, 2024

Related U.S. Application Data

(63) Continuation of application No. 17/378,628, filed on Jul. 16, 2021, now Pat. No. 12,044,544, which is a (Continued)

(30) Foreign Application Priority Data

May 29, 2019 (CN) ........................ 201910458925.3

(51) Int. Cl.
*G01C 21/36* (2006.01)
*B60L 3/12* (2006.01)
*G01C 21/00* (2006.01)

(52) U.S. Cl.
CPC ............ *G01C 21/3697* (2013.01); *B60L 3/12* (2013.01); *G01C 21/3614* (2013.01); *G01C 21/3856* (2020.08); *B60L 2250/16* (2013.01)

(58) Field of Classification Search
CPC ............ G01C 21/3697; G01C 21/3856; G01C 21/3614; B60L 2250/15; B60L 3/12
(Continued)

(56) References Cited

U.S. PATENT DOCUMENTS 5,243,690 A * 9/1993 Chmielewski, Jr. ... B25J 9/1697 700/262
8,417,401 B2 4/2013 Takahara et al.
(Continued)

FOREIGN PATENT DOCUMENTS

CN 103292820 A 9/2013
CN 104620077 A 5/2015
(Continued)

OTHER PUBLICATIONS

Stack Overflow, "Generate a random point within a circle (uniformly)", <https://stackoverflow.com/questions/5837572/generate-a-random-point-within-a-circle-uniformly>, Accessed from archive, Feb. 2019. (Year: 2018).*
(Continued)

*Primary Examiner* — Erin D Bishop
*Assistant Examiner* — Karen Lynelle Furgason
(74) *Attorney, Agent, or Firm* — Anova Law Group, PLLC

(57) ABSTRACT

An image processing method and apparatus, an electronic device, and a storage medium for obtaining a remaining mileage parameter of a vehicle; obtaining a start position of the vehicle on a map display interface; determining a target travel range on the map display interface according to the start position and the remaining mileage parameter; and displaying the target travel range on the map display interface.

20 Claims, 13 Drawing Sheets

Related U.S. Application Data continuation of application No. PCT/CN2020/090968, filed on May 19, 2020.

(58) Field of Classification Search
USPC .......................................................... 701/532
See application file for complete search history.

(56) References Cited

U.S. PATENT DOCUMENTS

| | | | | |
|---|---|---|---|---|
| 10,578,455 | B2 | 3/2020 | Adachi et al. | |
| 10,690,506 | B2 | 6/2020 | De Nunzio et al. | |
| 2011/0202219 | A1 | 8/2011 | Ishibashi | |
| 2013/0147820 | A1* | 6/2013 | Kalai | G01C 21/3889 345/522 |
| 2013/0179062 | A1 | 7/2013 | Yasushi et al. | |
| 2013/0282265 | A1 | 10/2013 | Arita et al. | |
| 2014/0278038 | A1* | 9/2014 | Stankoulov | G06T 11/203 701/123 |
| 2015/0142305 | A1 | 5/2015 | Kubo | |

FOREIGN PATENT DOCUMENTS

| | | | | |
|---|---|---|---|---|
| CN | 107576331 | A | | 1/2018 |
| CN | 108180907 | A | | 6/2018 |
| CN | 108253981 | A | | 7/2018 |
| CN | 110186473 | A | | 8/2019 |
| DE | 102008037262 | A1 | | 5/2009 |
| DE | 102011015778 | A1 | | 10/2012 |
| DE | 102012023632 | A1 | | 6/2014 |
| EP | 2172740 | A1 | | 4/2010 |
| EP | 3091336 | A1 | | 11/2016 |
| EP | 3363707 | A1 | | 8/2018 |
| JP | H1116094 | A | | 1/1999 |
| JP | 2016048583 | A | * | 4/2016 |
| JP | 2020159808 | A | | 10/2020 |
| WO | 2011029562 | A1 | | 3/2011 |
| WO | 2020161335 | A1 | | 8/2020 |

OTHER PUBLICATIONS

The World Intellectual Property Organization (WIPO) International Search Report for PCT/CN2020/096098 Aug. 18, 2020 8 Pages (including translation).

The Japan Patent Office (JPO) Notification of Reasons for Refusal for Application No. 2021-539361 Aug. 8, 2022 6 pages (including translation).

The European Patent Office (EPO) The Extended European Search Report for 20812740.7 Jan. 26, 2022 11 Pages (including translation).

* cited by examiner

IMAGE PROCESSING METHOD AND APPARATUS, ELECTRONIC DEVICE, AND STORAGE MEDIUM

CROSS REFERENCES TO RELATED APPLICATIONS

This application is a continuation of U.S. application Ser. No. 17/378,628 filed on Jul. 16, 2021; U.S. application Ser. No. 17/378,628 is a continuation application of PCT Application No. PCT/CN2020/090968, entitled "IMAGE PROCESSING METHOD AND APPARATUS, AND ELECTRONIC DEVICE AND STORAGE MEDIUM" and filed on May 19, 2020, which in turn claims priority to Chinese Patent Application No. 201910458925.3, entitled "IMAGE PROCESSING METHOD AND APPARATUS, ELECTRONIC DEVICE, AND STORAGE MEDIUM" and filed with the China National Intellectual Property Administration on May 29, 2019. The three applications are all incorporated herein by reference in entirety.

FIELD OF THE TECHNOLOGY

This application relates to the field of computer technologies, and in particular, to an image processing method and apparatus, an electronic device, and a storage medium.

BACKGROUND OF THE DISCLOSURE

When a user travels in a car, the user often plans the next route according to the remaining driving mileage on the tank of the car. At present, the travelable mileage of the car is often displayed in the form of numerical values, that is, the driving mileage is displayed numerically on a car dashboard. For example, "driving mileage 100 km" is displayed on the dashboard.

However, displaying the remaining driving mileage only by numerical values results is indirect and unspecific information presented to the user. Subsequently, the user needs to manually estimate an estimated reachable range combined with the current road condition and the remaining driving mileage, to further determine the route. Therefore, the efficiency of route planning is reduced.

SUMMARY

Embodiments of this application provide an image processing method and apparatus, an electronic device, and a storage medium, to intuitively show an estimated reachable range of a car to a user, thereby improving the efficiency of route planning.

One aspect of the present disclosure provides an image processing method, performed by an electronic device. The method including obtaining a remaining mileage parameter of a vehicle; obtaining a start position of the vehicle on a map display interface; determining a target travel range on the map display interface according to the start position and the remaining mileage parameter; and displaying the target travel range on the map display interface.

Another aspect of the present disclosure further provides an image processing apparatus. The apparatus includes a first obtaining module, configured to obtain a remaining mileage parameter of a vehicle; a second obtaining module, configured to obtain a start position of the vehicle on a map display interface; a target area determining module, configured to determine a target travel range on the map display interface according to the start position and the remaining mileage parameter; and the first obtaining module being further configured to display the target travel range on the map display interface.

An embodiment of this application further provides an electronic device, including a processor and a memory, the processor being connected to the memory, the memory being configured to store a computer program, and the processor being configured to invoke the computer program, to perform the method according to the embodiments of this application.

Another aspect of the present disclosure further provides a non-transitory computer storage medium, the computer storage medium storing a computer program, the computer program including program instructions, the program instructions, when executed by a processor, performing the method according to the embodiments of this application.

In embodiments consistent with the present disclosure, a remaining mileage parameter of a vehicle is obtained; a start position of the vehicle on a map display interface is obtained; a target travel range is determined on the map display interface according to the start position and the remaining mileage parameter; and the target travel range is determined on the map display interface. Compared to manually estimating a target travel range according to a remaining mileage and a current road condition, automatically determining the target travel range on a map interface can more intuitively show an estimated reachable range of a car to a user, thereby improving the efficiency of subsequent route planning.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 1:
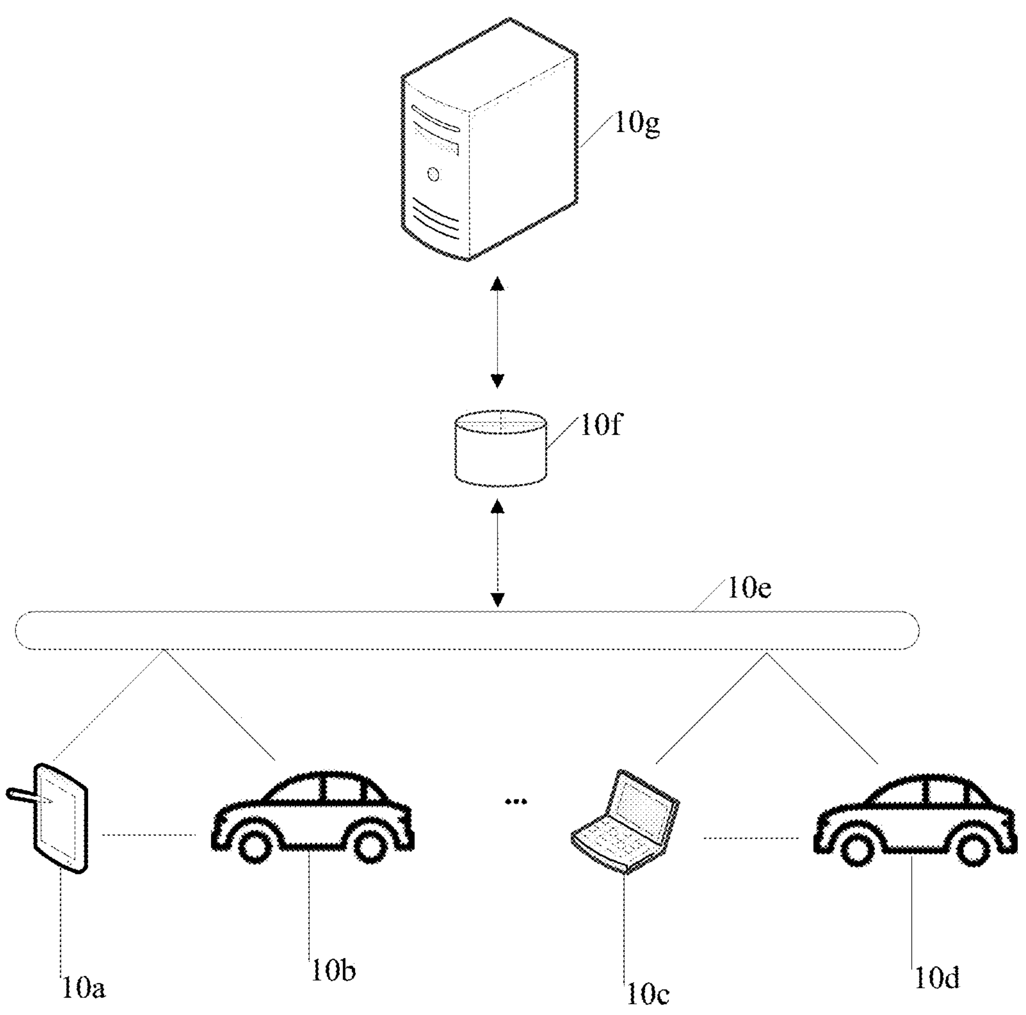
FIG. 1 is a system architecture diagram of image processing according to an embodiment of this application.

FIG. 1 is a system architecture diagram of image processing according to an embodiment of this application. A server 10*g* establishes a connection with a user terminal cluster and a car cluster through a switch 10*f* and a communication bus 10*e*. The user terminal cluster may include a user terminal 10*a*, a user terminal 10*c*, and the like. The car cluster that has a binding relationship with the user terminal 10*a* and the user terminal 10*c* respectively may include a car 10*b*, a car 10*d*, and the like.

By using the user terminal 10*a* and the car 10*b* as an example, when an in-vehicle navigation in the car 10*b* is started, the car 10*b* transmits a remaining mileage and a current position to the server 10*g* through the switch 10*f* and the communication bus 10*e*. The server 10*g* determines an estimated reachable range of the car 10*b* on a map according to the remaining mileage and the current position. The server 10*g* may transmit the estimated reachable range to the car 10*b*, to display the estimated reachable range on a map page of the in-vehicle navigation in the car 10*b*. The server 10*f* may further transmit the estimated reachable range to the user terminal 10*a* that has a binding relationship with the car 10*b*, and the estimated reachable range may also be displayed on a map page of the user terminal 10*a*.

In some embodiments, the estimated reachable range may be alternatively determined on the map page by the car (or the user terminal) according to the remaining mileage and the current position of the car. Similarly, the estimated reachable range may be displayed on the map page of the in-vehicle navigation (or the map page of the user terminal).

A specific description is made by using an example in which how the user terminal 10*a* determines the estimated reachable range of the car according to the remaining mileage and the current position of the car.

The user terminal 10*a*, the user terminal 10*c*, and the like shown in FIG. 1 may include a mobile phone, a tablet computer, a notebook computer, a palmtop computer, a mobile Internet device (MID), a wearable device (for example, a smart watch or a smart bracelet), and the like.

Figure 2A:
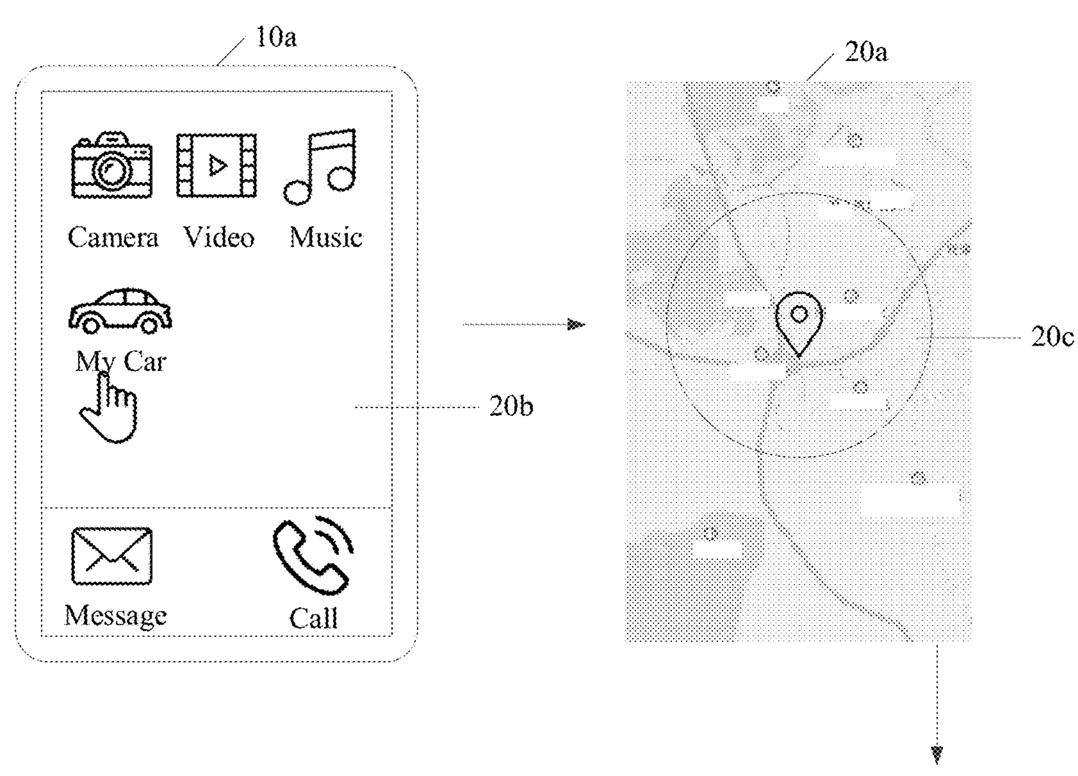
FIG. 2*a* to FIG. 2*b* are schematic diagrams of scenarios of image processing according to an embodiment of this application.
Figure 2A:
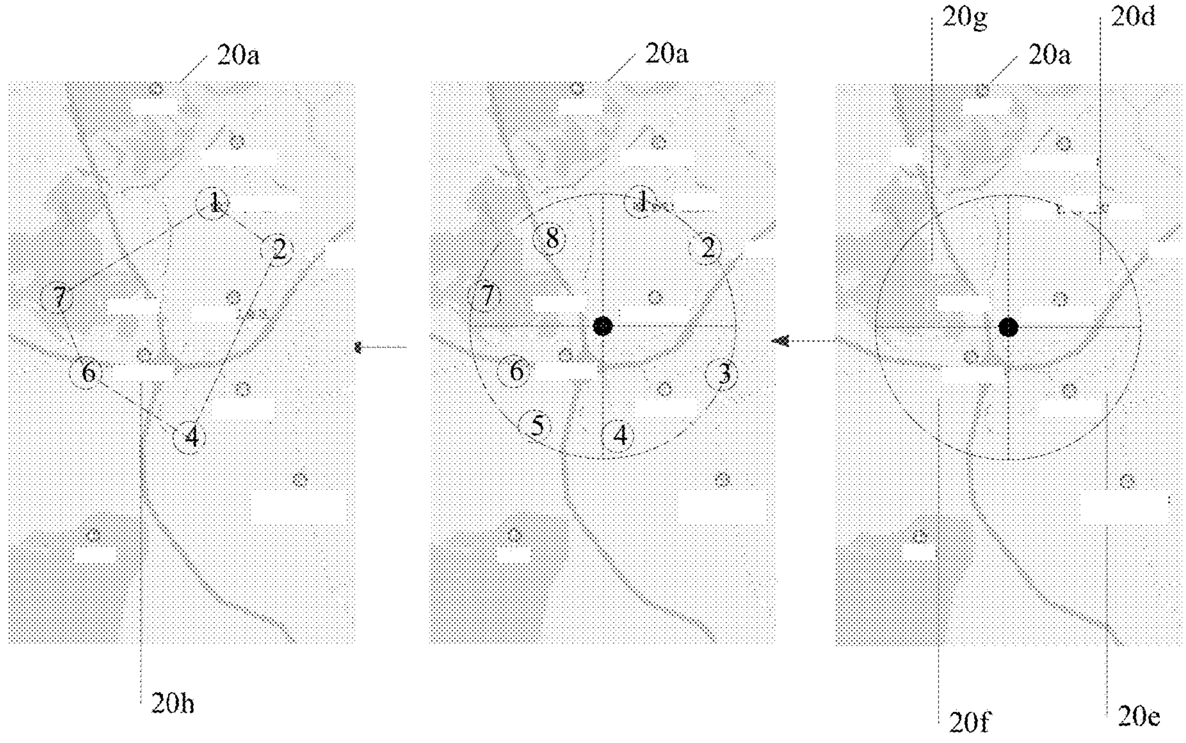
Figure 2B:
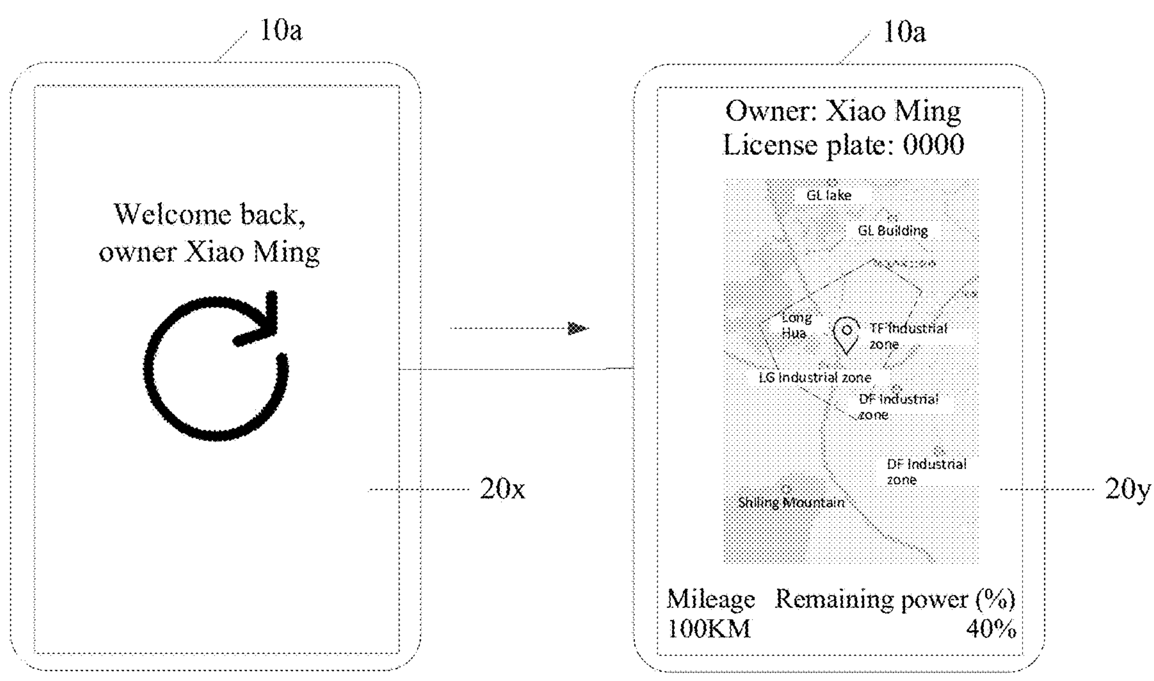

FIG. 2*a* to FIG. 2*b* are schematic diagrams of scenarios of image processing according to an embodiment of this application. As shown in an interface 20*b* of the user terminal 10*a* in FIG. 2*a*, a user clicks on a "My Car" App to start the App. The App is used to manage car information of a car that has a binding relationship with the user terminal 10*a*, that is, the car may transmit the car information to the user terminal 10*a* through the Internet of Vehicles. The user terminal 10*a* may further transmit instructions to the car through the Internet of Vehicles.

The user terminal 10*a* obtains a remaining mileage and current position information of the car, obtains a map scale factor of a built-in map page 20*a* of the "My Car" App, and determines a radius factor according to the map scale factor and the remaining mileage. The terminal device 10*a* determines an original reachable area 20*c* on the map page 20*a* by using the current position of the car as a center of a circle and the radius factor as a radius. Because the original reachable area 20*c* is a circle determined according to the remaining mileage, regardless of which direction the car travels to, a remaining mileage exhaustion point is located in the original reachable area 20*c* or on a boundary of the original reachable area 20*c*.

On the map page 20*a*, the user terminal 10*a* divides the original reachable area 20*b* into four unit original reachable areas by using a center of the original reachable area 20*c* as a center and 90° as intervals, which are a unit original reachable area 20*d*, a unit original reachable area 20*e*, a unit original reachable area 20*f*, and a unit original reachable area 20*g*. Each unit original reachable area is fan-shaped.

The user terminal 10*a* respectively determines a plurality of candidate points in each unit original reachable area. A quantity of candidate points in each unit original reachable area may be the same or different; and a method for selecting candidate points in each unit original reachable area may be the same or different.

For example, candidate points may be selected in each unit original reachable area in a random method, or candidate points may be selected in each unit original reachable area at same intervals.

As shown in FIG. 2*a*, candidate points selected in the unit original reachable area 20*d* are a candidate point 1 and a candidate point 2; candidate points selected in the unit original reachable area 20*e* are a candidate point 3 and a candidate point 4; candidate points selected in the unit original reachable area 20*f* are a candidate point 5 and a candidate point 6; and candidate points selected in the unit original reachable area 20*g* are a candidate point 7 and a candidate point 8.

Next, the eight candidate points are filtered and retained. A specific process is for all the candidate points, the user terminal 10*a* invokes a route navigation interface to respectively determine a shortest road network distance between each candidate point and the current position of the car. The user terminal 10*a* deletes candidate points with shortest road network distances greater than the remaining mileage. In contrast, the user terminal 10*a* retains candidate points with shortest road network distances less than or equal to the remaining mileage. When a candidate point is in an unreachable area of the road network, such as a river, a mountain area, and an enclosed area, it indicates that a shortest road network distance between the candidate point and the current position of the car is infinite.

After part of candidate points are filtered out, remaining candidate points in each unit original reachable area need to be re-filtered. A specific process of re-filtering is the user terminal 10*a* only retains candidate points with the largest distances from the center of a circle (that is, the current position of the car) in each unit original reachable area, and filters out remaining candidate points in each unit original reachable area. The distance measurement method herein may be distances on the map page 20*a*, or shortest road network distances.

As shown in FIG. 2*a*, for the unit original reachable area 20*d*, the candidate point 1 and the candidate point 2 are finally retained (because the candidate point 1 and the candidate point 2 are points on the circle, the two candidate points may be retained simultaneously); for the unit original reachable area 20*e*, the candidate point 4 is finally retained; for the unit original reachable area 20*f*, the candidate point 6 is finally retained; and for the unit original reachable area 20*g*, the candidate point 7 is finally retained.

On the map page 20*a*, the user terminal 10*a* connects the remaining candidate points in a clockwise or counterclockwise sequence, that is, sequentially connects the candidate point 1, the candidate point 2, the candidate point 4, the candidate point 6, and the candidate point 7. After connecting, an actual reachable area 20*h* may be determined on the map page 20*a*, and the actual reachable area 20*h* is rendered on the map page 20*a*, that is, the actual reachable area 20*h* is marked on the map page 20*a*.

If the remaining mileage is less than or equal to a mileage threshold, the user terminal 10*a* may render a boundary of the actual reachable area 20*h* in red; and if the remaining mileage is greater than the mileage threshold, the user terminal 10*a* may render the boundary of the actual reachable area 20*h* in blue. In some embodiments, in addition to rendering the boundary of the actual reachable area 20*h* with different colors for prompting the user, lines of different thicknesses, or solid lines and/or dashed lines may be alternatively used to render the boundary of the actual reachable area 20*h* for prompting the user.

As shown in an interface 20*x* in FIG. 2*b*, after the "My Car" App is started, before entering the App, a preset animation may be played on a screen of the user terminal. At the same time, the user terminal 10*a* may determine the actual reachable area 20*h* on the map page 20*a* in parallel. When it is detected that the actual reachable area 20*h* is determined, as shown in an interface 20*y*, playing of the animation is stopped, a homepage of the App is entered, and the map page 20*a* rendered with the actual reachable area 20*h* is displayed on the homepage. At the same time, a plate number, an owner's name, a remaining mileage (that is, the mileage in FIG. 2*b*), remaining power (or remaining fuel), and the like of the car that has a binding relationship with the user terminal 10*a* may also be displayed on the homepage of the App. In this way, the user may view, through the user terminal 10*a*, the farthest distance range that the car can travel, which is convenient for route planning.

Subsequently, the user terminal 10*a* may transmit the map page 20*a* rendered with the actual reachable area 20*h* to the car that has a binding relationship with the user terminal 10*a*. When the in-vehicle navigation of the car is started, the map page 20*a* rendered with the actual reachable area 20*h* may be displayed on a display screen of the car to prompt the owner of the estimated reachable range of the car.

The specific processes of determining an original travel range (such as the original reachable area 20*c* in the foregoing embodiment corresponding to FIG. 2*a*), generating original candidate points (such as the candidate point 1, the candidate point 2, . . . , and the candidate point 8 in the foregoing embodiment corresponding to FIG. 2*a*), and determining a target travel range (such as the actual reachable area 20*h* in the foregoing embodiment corresponding to FIG. 2*a*) may be referred to the following embodiments corresponding to FIG. 3*a* to FIG. 11*b*.

Figure 3A:
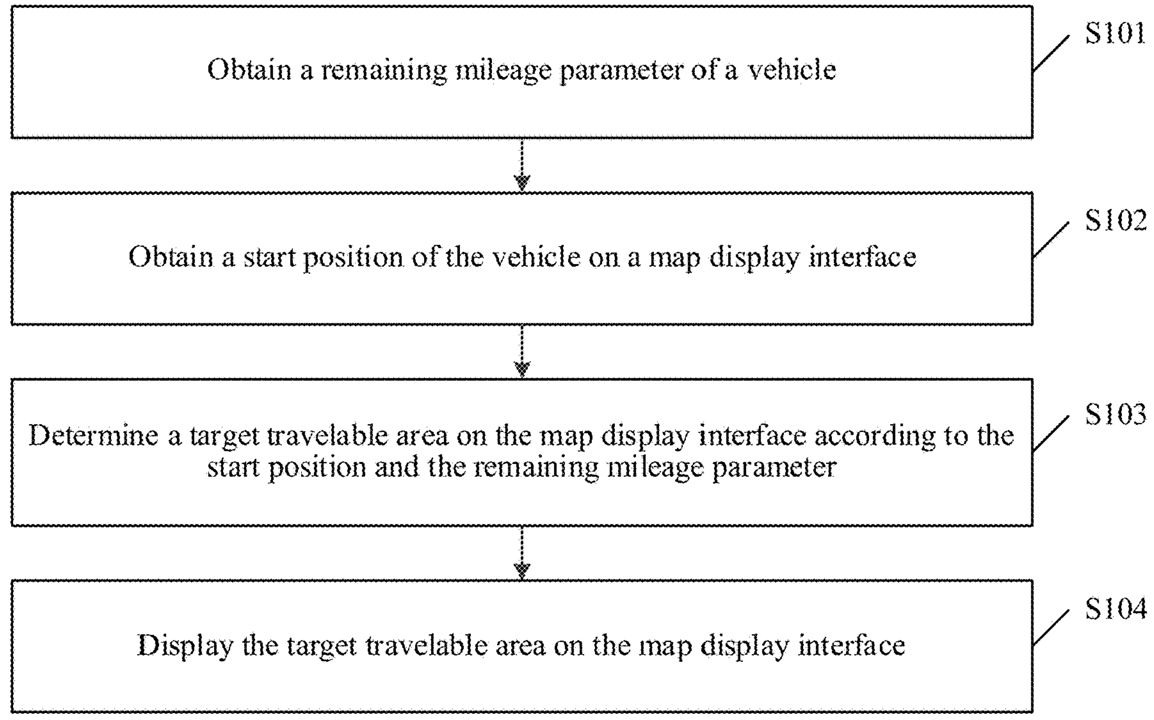
FIG. 3*a* is a schematic flowchart of an image processing method according to an embodiment of this application.

FIG. 3*a* is a schematic flowchart of an image processing method according to an embodiment of this application. As shown in FIG. 3*a*, the image processing method may include:

Step S101. Obtain a remaining mileage parameter of a vehicle.

An image processing process in this application involves a car and a terminal device. An execution entity of the following steps may be the car or the terminal device. If the execution entity is the car, after determining a target travel range, the car may transmit data of the area to the terminal device that has a binding relationship with the car; and if the execution entity is the terminal device, similarly, after determining the target travel range, the terminal device may transmit the data of the area to the car that has a binding relationship with the terminal device. The subsequent embodiments are described with a terminal device as an execution entity.

Specifically, a terminal device (such as the user terminal 10*a* in the foregoing embodiment corresponding to FIG. 2*a*) obtains a remaining mileage parameter of a vehicle (for example, a car). The remaining mileage parameter may be transmitted by the vehicle to the terminal device through the Internet of Vehicles. The remaining mileage parameter is a distance that the vehicle can travel determined based on current power or fuel. For example, the remaining mileage parameter is 200 km.

Step S102. Obtain a start position of the vehicle on a map display interface.

Specifically, the terminal device obtains the current position of the vehicle, where the current position may also be transmitted by the vehicle to the terminal device through the Internet of Vehicles.

The terminal device determines a start position on a map display interface (such as the map page 20*a* in the foregoing embodiment corresponding to FIG. 2*a*) according to the current position of the vehicle.

Step S103. Determine a target travel range on the map display interface according to the start position and the remaining mileage parameter.

Specifically, the terminal device may randomly determine a plurality of target points around the start position on the map display interface by using the start position as a center. On the map display interface, the plurality of target points are connected, and an obtained area is referred to as a target travel range (such as the actual reachable area 20*h* in the foregoing embodiment corresponding to FIG. 2*a*).

In this embodiment, the terminal device obtains a map scale factor of the map display interface, where the map scale factor is a ratio of a line segment length on the map display interface to an actual length of the corresponding line segment after horizontal projection.

Because the remaining mileage parameter is an actual distance, to determine the distance of the remaining mileage parameter on the map display interface, the terminal device determines a mileage radius factor according to the remaining mileage parameter and the map scale factor.

For example, the map scale factor is: 1 cm:10 km. If the remaining mileage parameter is 100 km, according to a proportional relationship, the mileage radius factor is 10 cm, that is, the actual distance is 100 km and the distance on the map display interface is 10 cm.

On the map display interface, the terminal device generates a circle (referred to as a mileage circle) by using the start position as a center of a circle and the mileage radius factor as a radius, and uses the corresponding area of the mileage circle on the map display interface as the target travel range.

In this embodiment, in addition to the foregoing two methods of determining the target travel range, the following method (that is, a third method) may be further used to determine the target travel range: on the map display interface, the terminal device generates a circle (referred to as a mileage circle) by using the start position as a center of a circle and the mileage radius factor as a radius, and uses the corresponding area of the mileage circle on the map display interface as an original travel range (such as the original reachable area 20*c* in the foregoing embodiment corresponding to FIG. 2*a*).

Because the original travel range is the circle determined on the map display interface according to the remaining mileage parameter, and is irrelevant to the real road network. However, real roads are generally curved, so that regardless of which direction the vehicle travels to, a fuel exhaustion point or power exhaustion point is necessarily in the original travel range or on a boundary of the original travel range.

In this embodiment, on the map display interface, the terminal device generates a square area with the start position as a center, where a distance from a center to a vertex of the square area may be equal to the mileage radius factor. Similarly, the terminal device may use the square area as the original travel range.

Optionally, on the map display interface, the terminal device generates a regular hexagon area with the start position as a center, where a distance from the center to each vertex of the regular hexagon area may be equal to the mileage radius factor. Similarly, the terminal device may use the regular hexagon area as the original travel range.

A plurality of original candidate points are determined in the original travel range (for example, the plurality of original candidate points may be determined in a random method), and original candidate points reachable by the vehicle are selected from the plurality of original candidate points as reachable candidate point, where reachable by the vehicle means that road network path distances between the reachable candidate points and the start position are less than or equal to the remaining mileage parameter. A road network path distance refers to a real road distance between a point A and a point B. Generally, because a road is curved and a straight-line distance between two points is the shortest, a road network path distance is greater than the straight-line distance between two points.

In this embodiment, if an original candidate point is in an unreachable area of the road network such as a river, a mountain area, and a closed control area, it may be considered that a road network path distance between the original candidate point and the start position is infinite, that is, the original candidate point in the unreachable area of the road network is deleted and would not be used as a reachable candidate point.

The reachable candidate points are all used as target points. On the map display interface, the plurality of target points are connected, and an obtained area is referred to as the target travel range.

Step S104. Display the target travel range on the map display interface.

Specifically, the terminal device may render the target travel range on the map display interface, that is, mark the target travel range on the map display interface.

If the remaining mileage parameter is less than or equal to the mileage threshold, the terminal device may render a boundary of the target travel range in red; and if the remaining mileage parameter is greater than the mileage threshold, the terminal device may render the boundary of the target travel range in blue. In some embodiments, in addition to rendering the boundary of the target travel range with different colors, lines of different thicknesses, or solid lines and/or dashed lines may be alternatively used to render the boundary of the target travel range, and different colors may be even used to render the entire target travel range.

Figure 3B:
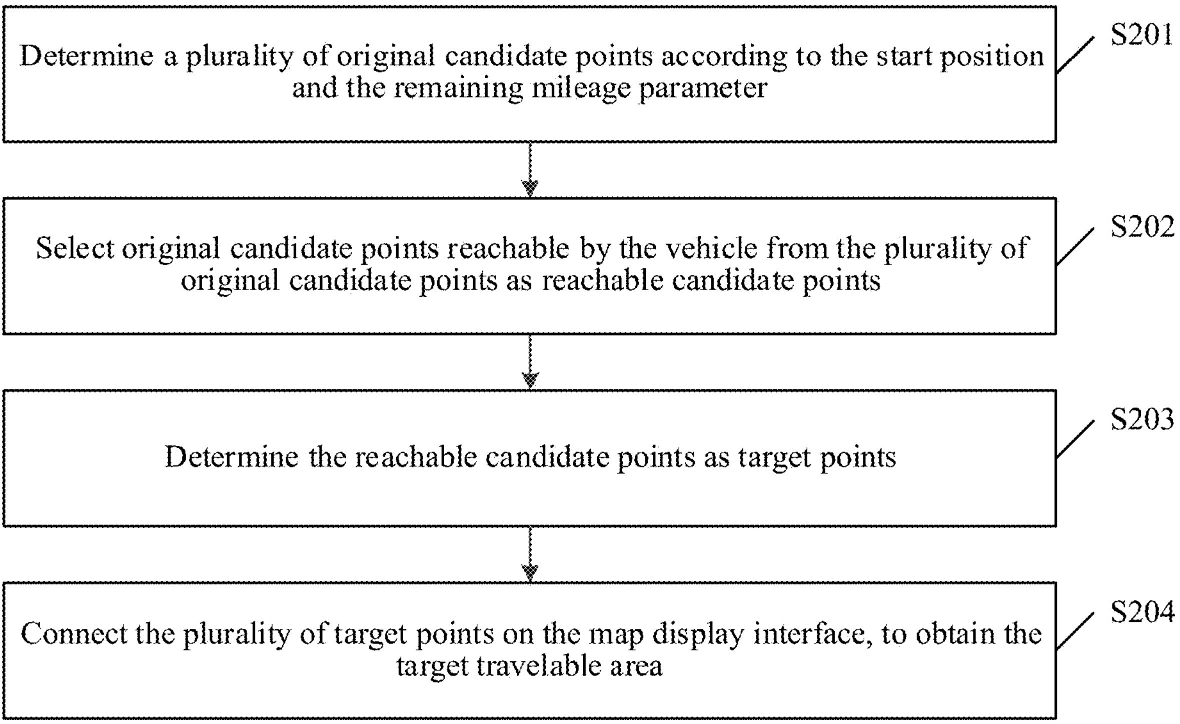
FIG. 3*b* is a schematic flowchart of determining a target travel range according to an embodiment of this application.

FIG. 3*b* is a schematic flowchart of determining a target travel range according to an embodiment of this application. Determining the target travel range includes steps S201 to S204, and steps S201 to S204 are a specific embodiment of the third method of determining the target travel range in step S103 in the embodiment corresponding to FIG. 3*a:*

Step S201. Determine a plurality of original candidate points according to the start position and the remaining mileage parameter.

On the map display interface, the terminal device generates a mileage circle by using the start position as a center of a circle and the mileage radius factor as a radius, and uses the corresponding area of the mileage circle on the map display interface as the original travel range.

The terminal device obtains a polar angle separation factor, and divides the original travel range by using the start position as a center and the polar angle separation factor as an interval, to obtain a plurality of unit original travel ranges (such as the unit original reachable area 20*d*, the unit original reachable area 20*e*, the unit original reachable area 20*f*, and the unit original reachable area 20*g* in the foregoing embodiment corresponding to FIG. 2*a*). An area size and a shape of each unit original travel range may be the same.

If the original travel range is circular, each unit original travel range is fan-shaped, and a central angle of the fan shape is equal to the polar angle separation factor.

When the original travel range is circular, to make the area size and the shape of each unit original travel range the same, it needs to be ensured that the polar angle separation factor is divisible by 360°, so that the original travel range may be divided into N identical unit original travel ranges, N being an integer greater than or equal to 1.

Generally, when the polar angle separation factor is smaller, the target travel range finally drawn is more precise, and correspondingly, a calculation amount and a data amount are increased; and when the polar angle separation factor is larger, a quantity of divided unit original travel range is smaller, which may result in an inaccurate target travel range finally drawn. Therefore, to balance the calculation amount and the fineness of the target travel range, it is determined in an embodiment of this application through multiple experiments that when the polar angle separation factor is equal to 10°, the calculation amount and the fineness of the target travel range can reach a better balance.

In this embodiment, if the original travel range is a square, after the terminal device still divides the original travel range by using the start position as the center and the polar angle separation factor as the interval, a plurality of triangle or quadrilateral unit original travel ranges may be obtained, and a vertex angle with respect to the start position in vertex angles of the unit original travel ranges is equal to the polar angle separation factor.

In this embodiment, if the original travel range is a regular hexagon, after the terminal device still divides the original travel range by using the start position as the center and the polar angle separation factor being 60° as the interval, six equilateral triangle unit original travel range may be obtained, and a vertex angle of the unit original travel ranges is equal to 60°.

The terminal device then divides each unit original travel range to obtain one or more unit original travel sub-ranges. A division principle is that a difference between a side length of each unit original travel sub-range (the side length herein refers to a length on the map display interface) and a first length threshold is less than a preset difference threshold.

On the map display interface, the terminal device uses a vertex of each unit original travel sub-range as an original candidate point (such as the candidate point 1, the candidate point 2, . . . , and the candidate point 8 in the foregoing embodiment corresponding to FIG. 2*a*).

Figure 4:
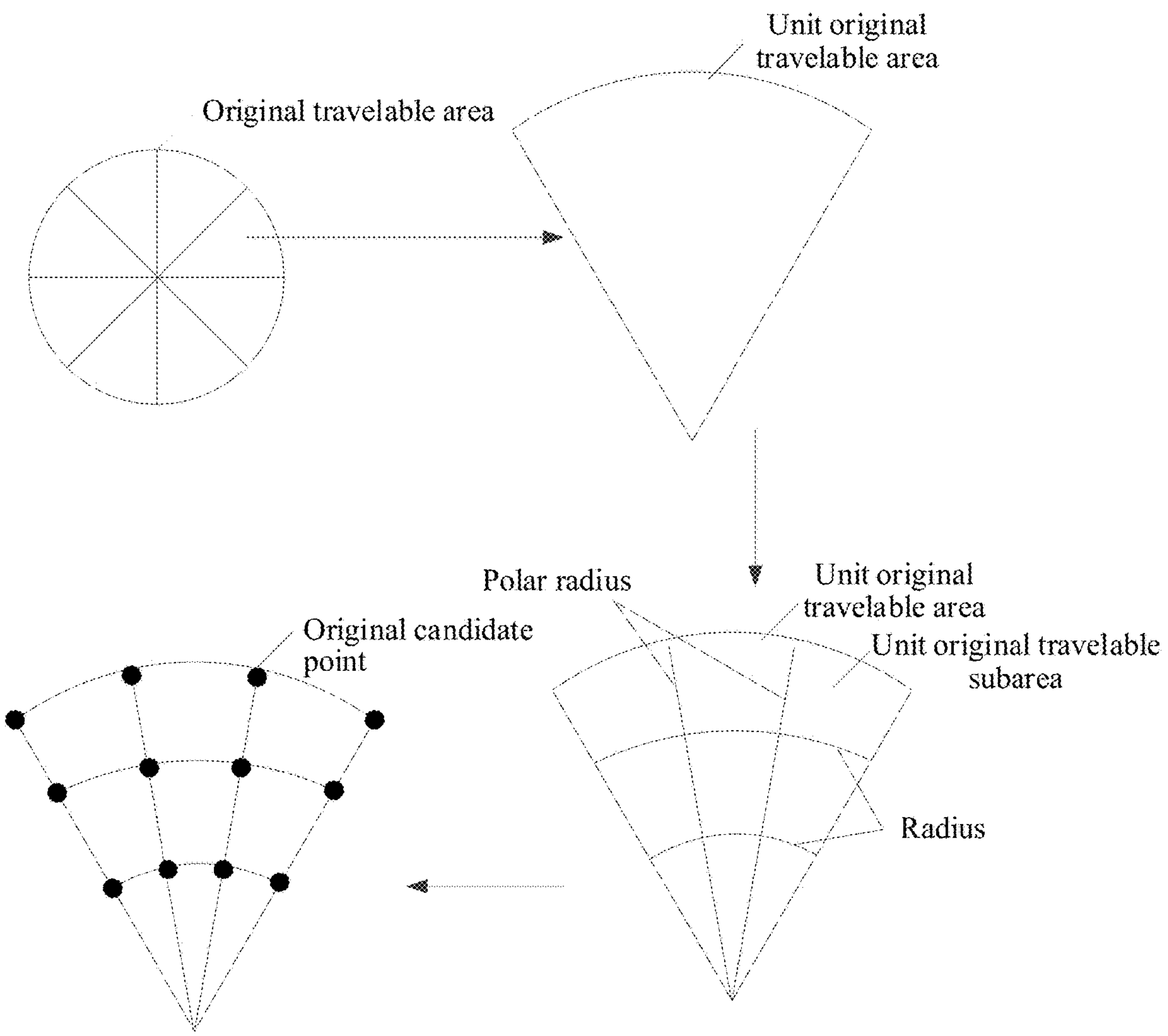
FIG. 4 is a schematic diagram of determining an original candidate point according to an embodiment of this application.

A specific process is described below in which a unit original travel range is divided into one or more unit original travel sub-ranges and a plurality of original candidate points are determined. FIG. 4 is a schematic diagram of determining an original candidate point according to an embodiment of this application. The original travel range is evenly divided into eight unit original travel ranges. One of the unit original travel ranges is described below. The unit original travel range is fan-shaped. The terminal device divides the unit original travel range from two dimensions of radius and polar radius. The radius refers to an intersection curve between a concentric circle curve of the original travel range and the unit original travel range. The polar radius refers to a line segment from a point on the circle of the unit original travel range to a vertex of the fan shape. A division purpose is that a difference between a side length of a "curved rectangle" or "curved triangle" enclosed by each polar radius and radius and the first length threshold is less than the preset difference threshold. It can be seen from FIG. 4 that through the division from the two dimensions of radius and polar radius, the unit original travel range may be divided into nine unit original travel sub-ranges, and a side length of each unit original travel sub-range is approximately equal to the first length threshold.

The terminal device may use vertices of all the unit original travel sub-ranges as the original candidate points. As can be seen from FIG. 4, nine unit original travel sub-ranges correspond to 12 candidate points.

In this embodiment, the vertices of all the unit original travel sub-ranges are used as the original candidate points above. Because an outer radius of a fan shape is larger than an inner radius, a distance between two adjacent original candidate points in the outer radius is necessarily greater than a distance between two adjacent original candidate points in the inner radius. To make distances between all the original candidate points approximately equal, for the original candidate points in the inner radius, a part of the original candidate points further need to be filtered out, to make distances between all retained original candidate points approximately equal.

For example, distances between four original candidate points in the outermost circle in FIG. 4 are necessarily greater than distances between four original candidate points in the innermost circle. Therefore, for the four original candidate points in the innermost circle, two original candidate points thereof may be filtered out, so that distances between the remaining original candidate points are approximately equal to the distances between the four original candidate points in the outermost circle.

Step S202. Select original candidate points reachable by the vehicle from the plurality of original candidate points as reachable candidate points.

Specifically, one original candidate point is used as an example below to describe how to determine whether the original candidate point is a reachable candidate point. The terminal device determines a road network path distance between the original candidate point and the start position. The road network path distance refers to the real road distance between the point A and the point B. Generally, because a road is curved and a straight-line distance between two points is the shortest, a road network path distance is greater than the straight-line distance between two points.

To avoid confusion, the difference between the three distances is repeated herein. The distance on the map display interface refers to a page distance. Generally, the distance is relatively small, and a unit thereof is generally cm. The distance on the map display interface may correspond to a straight-line distance in a real world, and the two are proportional. The road network path distance refers to a road path distance (or a path planning distance). Generally, the real straight-line distance between the point A and the point B is less than or equal to the road network path distance.

The original candidate points all have corresponding road network path distances. Original candidate points corresponding to road network path distances greater than the remaining mileage parameter are deleted, and original candidate points corresponding to road network path distances less than or equal to the remaining mileage parameter are retained. The terminal device may use all the retained original candidate points as reachable candidate points, that is, real road network positions corresponding to the reachable candidate points are positions reachable by the vehicle based on the remaining mileage parameter.

In this embodiment, if an original candidate point is in an unreachable area of the road network such as a river, a mountain area, and a closed control area, it may be considered that a road network path distance between the original candidate point and the start position is infinite, that is, the original candidate point in the unreachable area of the road network is deleted and would not be used as a reachable candidate point.

Step S203. Determine the reachable candidate points as target points.

Specifically, the terminal device respectively determines a distance (referred to as a map distance) between the start position and each reachable candidate point on the map display interface, and uses, in each unit original travel range, a reachable candidate point with a largest map distance as a to-be-determined target point of the original travel range.

In this embodiment, the terminal device determines a road network path distance (referred to as a candidate road network path distance) between the start position and each reachable candidate point, and uses, in each unit original travel range, a reachable candidate point with a largest candidate road network path distance as a to-be-determined target point of the original travel range.

For each unit original travel range and each original candidate point, reachable candidate points in each unit original travel range may be respectively determined according to the foregoing method. Then, a reachable candidate point with a largest distance from the start position in each unit original travel range is used as a to-be-determined target point, and finally to-be-determined target points in all unit original travel ranges are used as target points.

Step S204. Connect the plurality of target points on the map display interface, to obtain the target travel range.

Specifically, on the map display interface, the terminal device may connect each of the target points in a clockwise sequence or a counterclockwise sequence to obtain a candidate closed circle. The terminal device may directly use an area corresponding to the candidate closed circle on the map display interface as the target travel range.

Because the distribution of the road network is very complex, boundary smoothing processing may be further performed on the candidate closed circle, to reduce the deformity caused on the drawing of the target travel range by singular points caused by singular distribution of the road network, and then the terminal device uses the area after the boundary smoothing processing as the target travel range.

The boundary smoothing processing on the candidate closed circle includes finding a target point that meets a position sudden change condition, deleting the target point that meets the position sudden change condition, and connecting the remaining target points in a clockwise or counterclockwise direction. An obtained area is the target travel range after the boundary smoothing processing. The position sudden change means that the target point changes into a convex point or into a concave point.

There are two methods for the terminal device to perform boundary smoothing processing on the candidate closed circle. One of the methods is described below: the terminal device extracts three target points from all the target points, which are a first reachable point, a second reachable point, and a third reachable point, where in the candidate closed circle, the second reachable point is adjacent to the first reachable point, and the second reachable point is adjacent to the third reachable point. In short, the second reachable point is in the middle, and the first reachable point and the third reachable point are on both sides.

The terminal device connects the first reachable point and the second reachable point to obtain a first connection line. The terminal device connects the second reachable point and the third reachable point to obtain a second connection line. The terminal device uses an included angle between the first connection line and the second connection line as a connection line included angle (because the intersection of the first connection line and the second connection line is the second reachable point, there is an included angle between the first connection line and the second connection line). If the connection line included angle is less than an included angle threshold, it indicates that the second reachable point is a target point that meets the position sudden change condition, and the terminal device may delete the second reachable point.

The terminal device may continue to extract three target points from the remaining target points as a first reachable point, a second reachable point, and a third reachable point respectively, and re-determine whether the second reachable point meets the position sudden change condition. The process is repeated until there is no target point that meets the position sudden change condition among the remaining target points.

Figure 5:
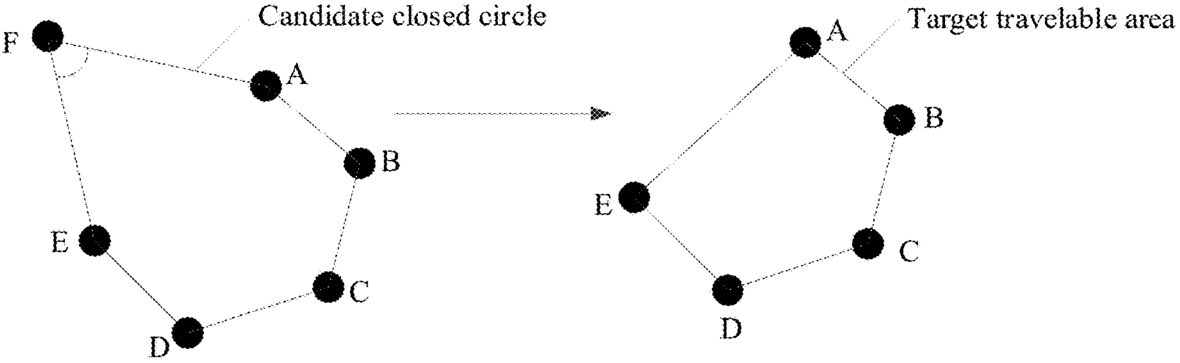
FIG. 5 is a schematic diagram of determining a target point meeting a position sudden change condition according to an embodiment of this application.

For example, FIG. 5 is a schematic diagram of determining a target point meeting a position sudden change condition according to an embodiment of this application. As shown in FIG. 5, a candidate closed circle includes: a target point A, a target point B, a target point C, a target point D, a target point E, and a target point F. The terminal device may first use the target point A as a first reachable point, use the target point B as a second reachable point, and use the target point C as a third reachable point. Because ∠ABC is greater than the included angle threshold, the target point B does not meet the position sudden change condition. The terminal device then uses the target point B as a first reachable point, uses the target point C as a second reachable point, and uses the target point D as a third reachable point. Because ∠BCD is greater than the included angle threshold, the target point C is a target point that does not meet the position sudden change condition. By analogy, when the target point E is used as a first reachable point, the target point F is used as a second reachable point, and the target point A is used as a third reachable point, because ∠EFA is less than the included angle threshold, the target point is a target point that meets the position sudden change condition, and the terminal device may delete the target point F. Subsequently, the terminal device re-determines, according to the remaining target points, whether there is a target point that meets the position sudden change condition. As shown in FIG. 5, after the target point F is deleted, the remaining target points A, B, C, D, and E do not meet the position sudden change condition. Therefore, the terminal device may connect the remaining target points A, B, C, D, and E in a clockwise sequence or a counterclockwise sequence, and an area obtained after the connection is the target travel range after the boundary smoothing processing.

The other method of performing boundary smoothing processing on the candidate closed circle is described below: the terminal device extracts three target points from all the target points, which are a first reachable point, a second reachable point, and a third reachable point, where in the candidate closed circle, the second reachable point is adjacent to the first reachable point, and the second reachable point is adjacent to the third reachable point. In short, the second reachable point is in the middle, and the first reachable point and the third reachable point are on both sides.

The terminal device connects the first reachable point and the third reachable point to obtain a third connection line, determines a distance between the second reachable point and the third connection line (referred to as a connection line distance), and determines a length of the third connection line. The connection line distance is divided by the length of the third connection line, and a ratio obtained is referred to as a connection line scale factor. If the connection line scale factor is greater than a preset scale factor threshold, the terminal device may use the second reachable point as a target point that meets the position sudden change condition, and the terminal device may delete the second reachable point.

The terminal device may continue to extract three target points from the remaining target points as a first reachable point, a second reachable point, and a third reachable point respectively, and re-determine whether the second reachable point meets the position sudden change condition. The process is repeated until there is no target point that meets the position sudden change condition among the remaining target points.

Figure 6:
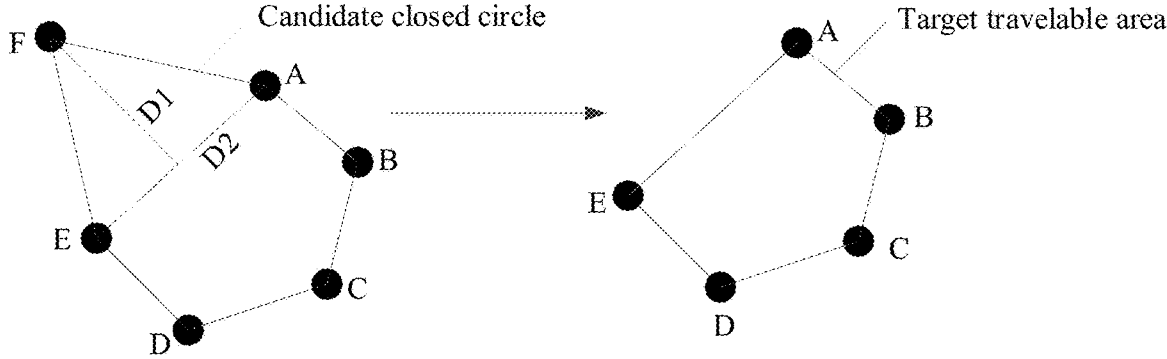
FIG. 6 is a schematic diagram of another determining a target point meeting a position sudden change condition according to an embodiment of this application.

For example, FIG. 6 is a schematic diagram of another determining a target point meeting a position sudden change condition according to an embodiment of this application. As shown in FIG. 6, a candidate closed circle includes: a target point A, a target point B, a target point C, a target point D, a target point E, and a target point F.

The terminal device may first use the target point A as a first reachable point, use the target point B as a second reachable point, and use the target point C as a third reachable point. Because a value of a distance between the target point B and a line segment AC divided by a length of the line segment AC is less than the preset scale factor threshold, the target point B does not meet the position sudden change condition. The terminal device then uses the target point B as a first reachable point, uses the target point C as a second reachable point, and uses the target point D as a third reachable point. Because a value of a distance between the target point C and a line segment BD divided by a length of the line segment BD is less than the preset scale factor threshold, the target point C does not meet the position sudden change condition. By analogy, when the target point E is used as a first reachable point, the target point F is used as a second reachable point, and the target point A is used as a third reachable point, because a value of a distance D1 (that is, the foregoing connection line distance) between the target point F and a line segment AE divided by a length D2 (that is, a length of the foregoing third connection line) of the line segment AE is greater than the preset scale factor threshold, the target point is a target point that meets the position sudden change condition, and the terminal device may delete the target point F. As shown in FIG. 6, after the target point F is deleted, the remaining target points A, B, C, D, and E do not meet the position sudden change condition. Therefore, the terminal device may connect the remaining target points A, B, C, D, and E in a clockwise sequence or a counterclockwise sequence, and an area obtained after the connection is the target travel range after the boundary smoothing processing.

Figure 7:
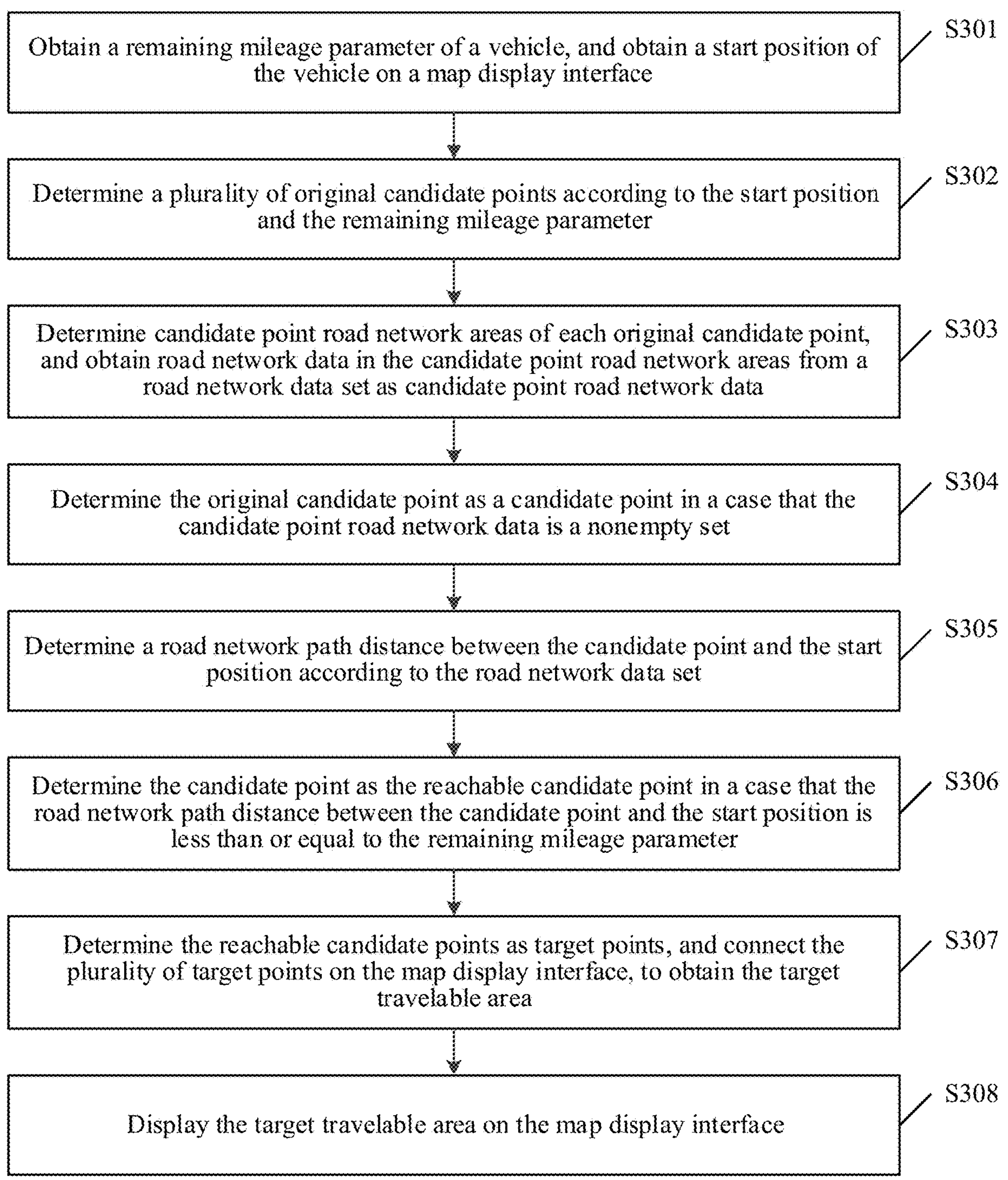
FIG. 7 is a schematic flowchart of another image processing method according to an embodiment of this application.

FIG. 7 is a schematic flowchart of another image processing method according to an embodiment of this application. As shown in FIG. 7, the image processing method may include:

Step S301. Obtain a remaining mileage parameter of a vehicle, and obtain a start position of the vehicle on a map display interface.

For a specific process of step S301, reference may be made to the description of steps S101 and S102 in the foregoing embodiment corresponding to FIG. 3*a*, and details are not described herein again.

Step S302. Determine a plurality of original candidate points according to the start position and the remaining mileage parameter.

For a specific process of step S302, reference may be made to the description of step S201 in the foregoing embodiment corresponding to FIG. 3*b*, and details are not described herein again.

Step S303. Determine candidate point road network areas of each original candidate point, and obtain road network data in the candidate point road network areas from a road network data set as candidate point road network data.

Specifically, one original candidate point is used as an example below to describe how to determine the candidate point road network data of the original candidate point.

The terminal device obtains a second length threshold, and determines a circle in a real road network by using a real position corresponding to the original candidate point as a center of a circle and the second length threshold as a radius. An area corresponding to the circle is the candidate point road network area. As can be learned, the second length threshold refers to a real straight-line distance.

In this embodiment, in addition to being circular, the candidate point road network area may alternatively be square. In the real road network, a square is determined by using the real position corresponding to the original candidate point as the center and the second length threshold as a distance from the center to a vertex, and an area corresponding to the square is the candidate point road network area. The second length threshold may be equal to 1 km.

When the second length threshold is 1 km, the candidate point road network area may be understood as: a real road area of 1 km around the original candidate point is the candidate point road network area.

In this embodiment, according to the scale factor of the map display interface and the foregoing first length threshold (the foregoing first length threshold is used to divide a plurality of unit original travel sub-ranges), the first length threshold may be converted into a real straight-line distance A. The real straight-line distance A and the second length threshold B meet the following relationship: A=2×B. The second length threshold is an optimal empirical value determined through multiple experiments, and the first length threshold is determined by the foregoing relationship.

For example, when the second length threshold is equal to 1 km, the real straight-line distance A corresponding to the first length threshold is 2 km. While the real straight-line distance A and the second length threshold B meet a 2-times relationship, candidate point road network areas corresponding to all original candidate points may basically cover the real road area corresponding to the original travel range, avoiding missing of a road area, and making the finally determined target travel range more accurate.

Figure 8:
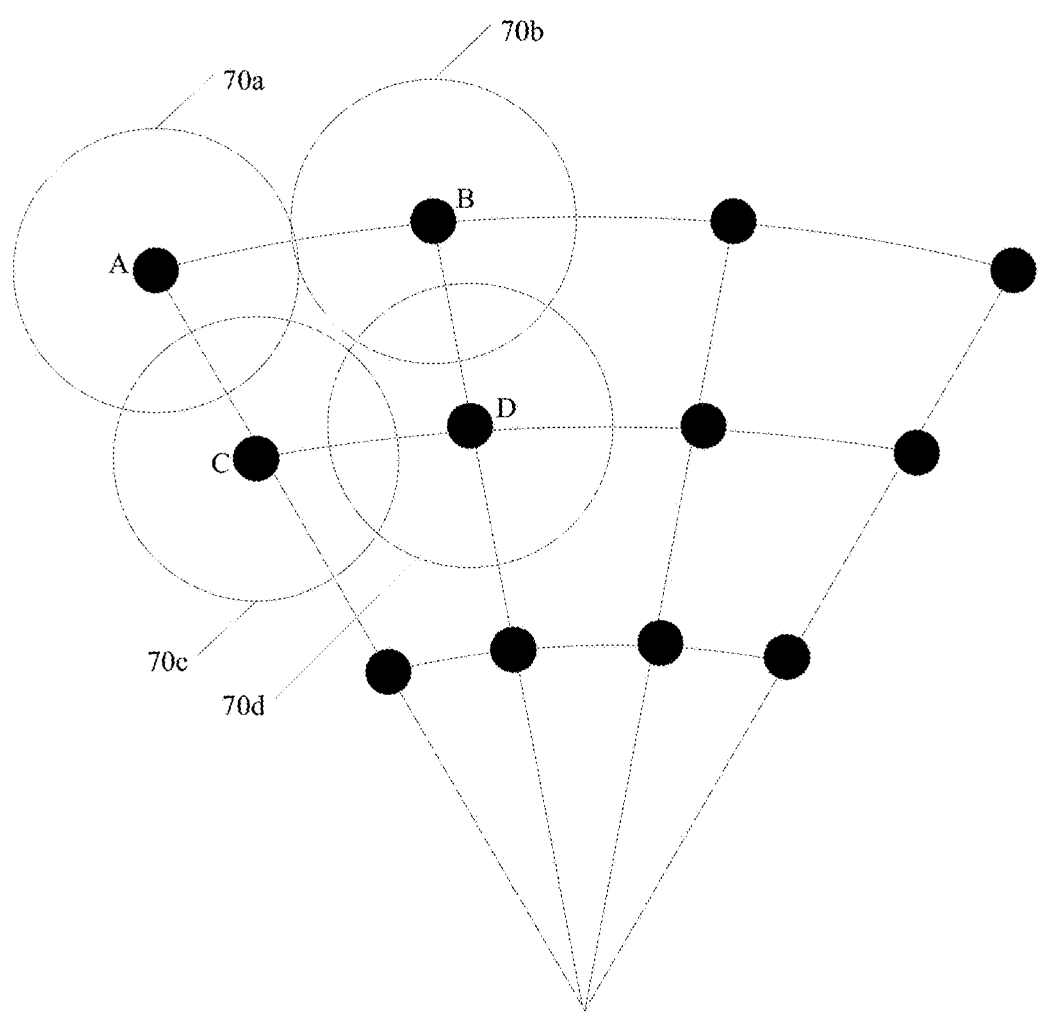
FIG. 8 is a schematic diagram of a relationship between a first length threshold and a second length threshold according to an embodiment of this application.

FIG. 8 is a schematic diagram of a relationship between a first length threshold and a second length threshold according to an embodiment of this application. Four original candidate points (an original candidate point A, an original candidate point B, an original candidate point C, and an original candidate point D) are used as an example for description. A candidate point road network area corresponding to the original candidate point A is an area 70*a*; a candidate point road network area corresponding to the original candidate point B is an area 70*b*; a candidate point road network area corresponding to the original candidate point C is an area 70*c*; and a candidate point road network area corresponding to the original candidate point D is an area 70*d*. A real straight-line distance between the original candidate point A and the original candidate point B=twice of a radius of the foregoing four candidate point road network areas. As can be seen from FIG. 8, because of the twice relationship, the foregoing four candidate point road network areas may basically cover the real road area formed by the four original candidate points in the road network area. In this way, missing of a road area can be avoided, thereby making the finally determined target travel range more accurate.

The terminal device obtains road network data of each candidate point road network area from a road network data set as candidate point road network data.

A specific description is made below about how to obtain road network data contained in a candidate point road network area. The road network data set may be stored in a database according to an organizational form of <Block, Rec>, where Block is a road network data block, and Rec is a unit road network data block. The road network data set may correspond to a plurality of Blocks. Each Block contains a plurality of Recs, and each Rec may not contain road network data, may contain one road network data, or may contain a plurality of road network data. Road network data contained in all Recs may be combined into a road network data set. Each Block is approximately equal, and Recs contained in each block are also approximately equal. Therefore, to determine the road network data contained in the candidate point road network area, logically, a Rec where the candidate point road network area is located needs to be determined first.

In this embodiment, an actual side length corresponding to each Block may be 12.5 km*8.33 km, and an actual side length corresponding to each Rec may be 100 m*100 m. It may be also understood that each Block may correspond to a real road network area, and the road network area is a rectangle with a side length of 12.5 km*8.33 km; each Rec may also correspond to a real road network area, and the road network area is a rectangle with a side length of 100 m*100 m; and logically adjacent Recs (or Blocks) are also adjacent in real road network areas.

The terminal device obtains latitude and longitude information of a road network area where an original candidate point is located, where the latitude and longitude information include longitude and latitude, and searches a plurality of road network data blocks for a road network data block corresponding to the latitude and longitude information as a target road network data block, where the searching may be performed by geometric hash. The geometric hash searching method means that there is a hash function h(x, y), and the longitude and the latitude in the latitude and longitude information are respectively substituted into the hash function as x, y to obtain a hash value z, where the hash value=an ID of the road network data block, that is, the target road network data block corresponding to the latitude and longitude information may be found by using the latitude and longitude information and the hash function.

The terminal device searches four boundary latitude and longitude coordinates corresponding to the target data block, and may determine, according to a quantity of unit road network data blocks contained in the target road network data block, a unit road network data block (referred to as a first unit road network data block) corresponding to the latitude and longitude information.

Figure 9A:
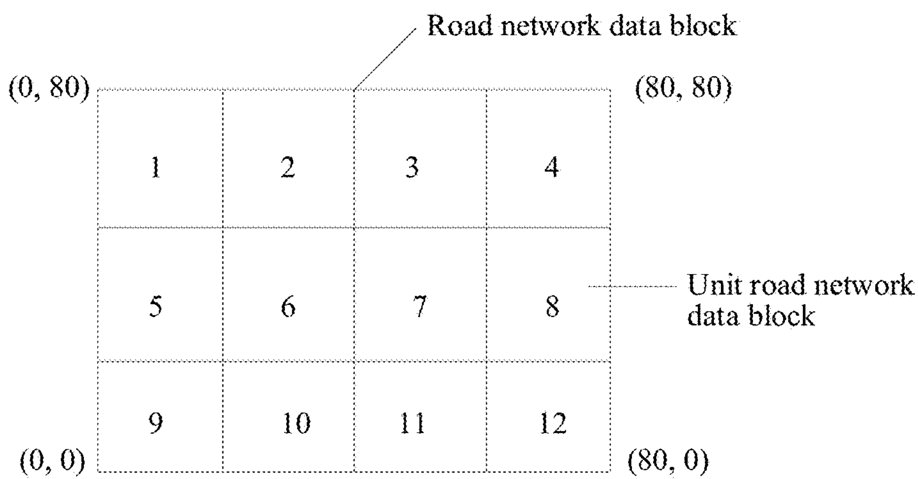
FIG. 9*a* is a schematic diagram of determining a first unit road network data block according to an embodiment of this application.

For example, FIG. 9*a* is a schematic diagram of determining a first unit road network data block according to an embodiment of this application. A road network data block shown in FIG. 9*a* includes 12 unit road network data blocks (which are respectively a unit road network data block 1, a unit road network data block 2, . . . , and a unit road network data block 12), and four boundary latitude and longitude coordinates of the road network data block are respectively (0, 0), (80, 0), (0, 80), and (80, 80). If latitude and longitude information corresponding to the original candidate point 1 is (25, 25), because the 12 unit road network data blocks are evenly divided, it may be calculated that a unit road network data block corresponding to the latitude and longitude information (25, 25) is the unit road network data block 6, that is, the unit road network data block 6 is a first unit road network data block.

The terminal device obtains a second length threshold, and determines a second unit road network data block according to the second length threshold and the first unit road network data block, where a real straight-line distance between the second unit road network data block and the first unit road network data block is less than or equal to the second length threshold.

The terminal device may use a road network area corresponding to the first unit road network data block and a road network area corresponding to the second unit road network data block as candidate point road network areas.

To quickly determine the second unit road network data block, the terminal device does not necessarily determine whether each unit road network data block is the second unit road network data block respectively, and may use a ratio of the second length threshold to a real side length corresponding to a unit road network data block as a data block factor, to extend in four directions (including horizontal to right, horizontal to left, vertical upward, and vertical downward) by using the first unit road network data block as a center. A quantity of unit data blocks passed by the extension is equal to the data block factor. Unit road network data blocks other than the first unit road network data block contained in a rectangular area obtained after the extension are all second unit road network data blocks, and a road network area corresponding to the rectangular area obtained after the extension is the candidate point road network area.

Figure 9B:
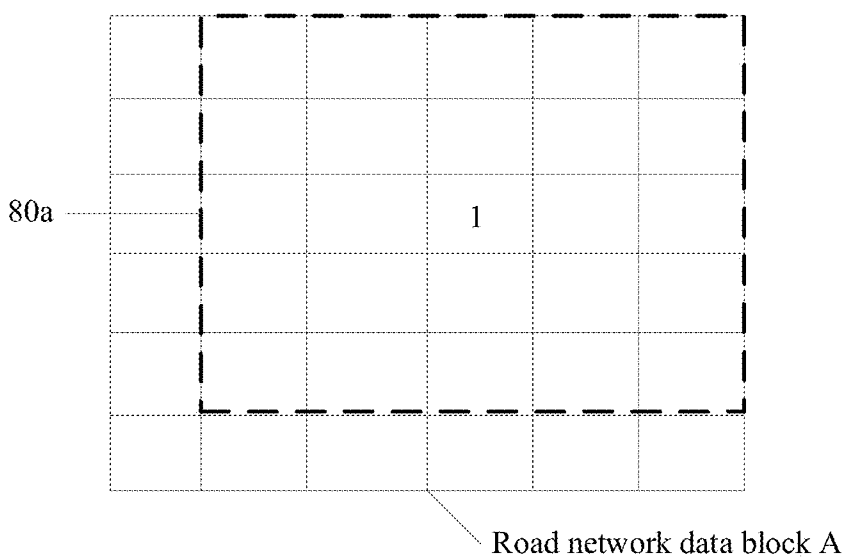
FIG. 9*b* is a schematic diagram of determining a second unit road network data block according to an embodiment of this application.

For example, FIG. 9*b* is a schematic diagram of determining a second unit road network data block according to an embodiment of this application. A road network data block A shown in FIG. 9*b* contains 36 unit road network data blocks, and a unit road network data block 1 is a first unit road network data block. If the second length threshold is 200 m, and an actual side length corresponding to the unit road network data block is equal to 100 m, the data block factor=200/100=2. The unit road network data block 1 is used as a center, a distance of two unit road network data blocks is extended in the horizontal to left direction, a distance of two unit road network data blocks is extended in the horizontal to right direction, a distance of two unit road network data blocks is extended in the vertical upward direction, and a distance of two unit road network data blocks is extended in the vertical downward direction, so that all unit road network data blocks other than the unit road network data block 1 in a determined area 80*a* are second unit road network data blocks.

According to the foregoing method, the candidate point area corresponding to each original candidate point, the first unit road network data block, and the second unit road network data block may be determined. To determine whether there is road network data in the candidate point area, the terminal device extracts road network data contained in the first unit road network data block from the database, extracts road network data contained in the second unit road network data block, and uses the extracted road network data as a road network data set.

Figure 10A:
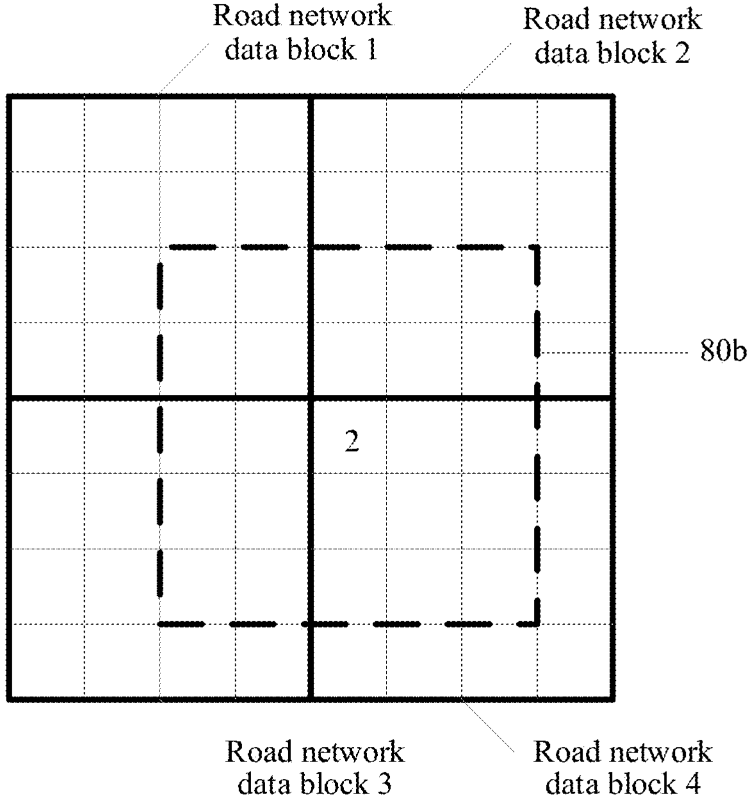
FIG. 10*a* is a schematic diagram of determining a second unit road network data block according to an embodiment of this application.

Due to the need of outward extension, there is a case in which the second unit road network data block corresponds to a plurality of Blocks. FIG. 10*a* is a schematic diagram of another determining a second unit road network data block according to an embodiment of this application. FIG. 10*a* contains four road network data blocks (which are respectively a road network data block 1, a road network data block 2, a road network data block 3, and a road network data block 4), and the unit road network data block 2 is a first unit road network data block. When the data block factor is equal to 2, it may be determined according to the foregoing method that unit road network data blocks other than the unit road network data block 2 in an area 80*b* are all second unit road network data blocks, and that the second unit road network data blocks pertain to the four road network data blocks. In this case, the terminal device needs to search road network data contained in the first unit road network data block and road network data contained in the second unit road network data blocks from the four road network data blocks in the database, as candidate point road network data.

Step S304. Determine the original candidate point as a candidate point when the candidate point road network data is a nonempty set.

Specifically, if the candidate point road network data is a nonempty set, that is, there are real roads in the candidate point road network area (that is, the candidate point road network area is not in a river, a mountain area, or a closed control area), the terminal device may then use the original candidate point as a candidate point.

Figure 10B:
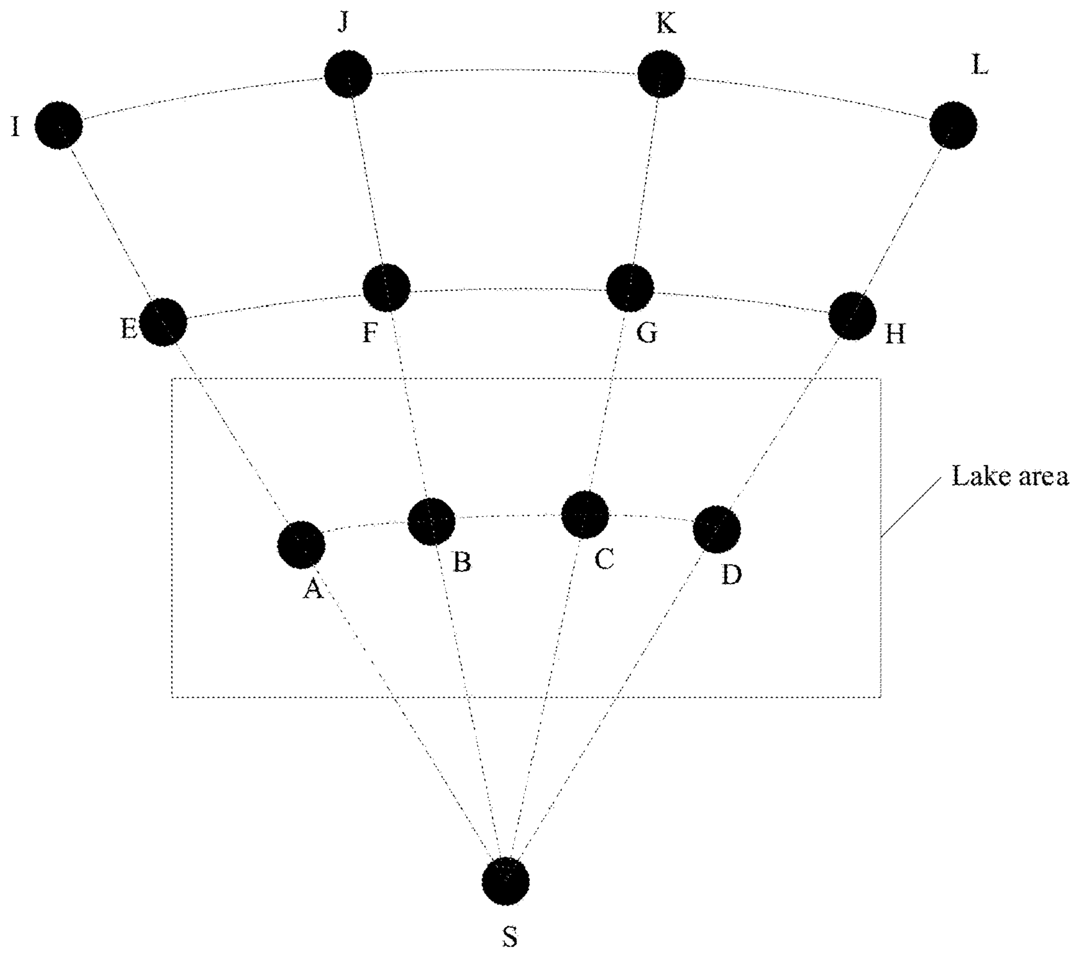
FIG. 10*b* is a schematic diagram of determining a candidate point according to an embodiment of this application.

FIG. 10*b* is a schematic diagram of determining a candidate point according to an embodiment of this application. FIG. 10*b* contains 12 original candidate points (which are respectively an original candidate points A, . . . , and an original candidate point L), and a point S is a start position. In FIG. 10*b*, if there is a road network data connection between two original candidate points, a solid line is used to connect the two candidate points; and if there is no road network data connection between two original candidate points, a dashed line is used to connect the two candidate points. As can be seen from FIG. 10*b*, because the original candidate point A, the original candidate point B, the original candidate point C, and the original candidate point D are in a lake area, and there is no road network data in candidate point road network areas corresponding to the four original candidate points. Therefore, the terminal device may filter out the original candidate point A, the original candidate point B, the original candidate point C, and the original candidate point D. In contrast, there is road network data in candidate road network areas corresponding to the remaining eight original candidate points (that is, the original candidate points E, . . . , and the original candidate point L), and the terminal device may then use the remaining eight original candidate points as candidate points.

Step S305. Determine a road network path distance between the candidate point and the start position according to the road network data set.

For the candidate points after the filtering, the terminal device may invoke a path planning interface to determine a road network path distance between each candidate point and the start position. The road network path distance refers to a real road distance (or referred to as a path planning distance) between two points.

The path planning interface may determine the road network path distance between the candidate point and the start position based on a Dijkstra algorithm or an A* search algorithm in path planning. The foregoing two algorithms are shortest path algorithms. The Dijkstra algorithm has higher accuracy but a larger calculation amount, while the A* search algorithm has lower accuracy but a smaller calculation amount. The following uses the A* search algorithm as an example to describe in detail how to determine the road network path distance between the candidate point and the start position.

Figure 11A:
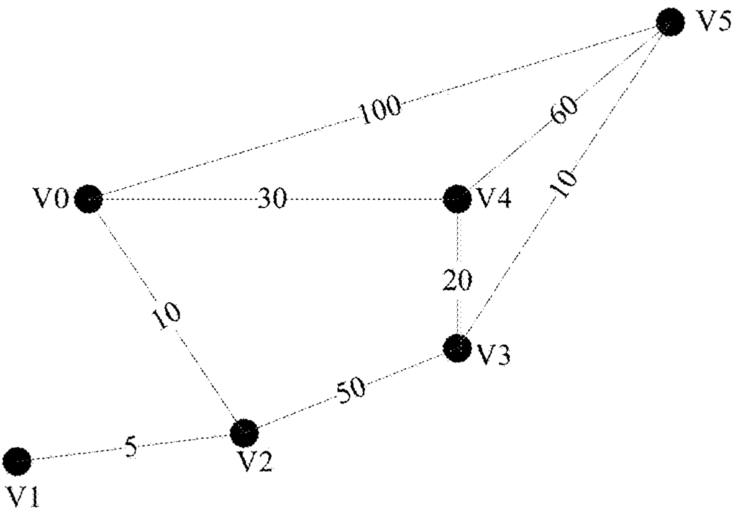
FIG. 11*a* is a schematic diagram of determining a road network path distance according to an embodiment of this application.

FIG. 11*a* is a schematic diagram of determining a road network path distance according to an embodiment of this application. To determine a road network path distance (also a shortest distance) between a vertex V0 to a vertex V5, an open list and a close list are first generated. In this case, both lists are empty sets. The terminal device first adds (V0, 0) to the open list. In this case, the open list contains (V0, 0), and the close list is empty. The first element in (V0, 0) represents the vertex, and the second element represents a distance between the vertex and the starting vertex V0.

The terminal device adds vertices adjacent to V0 to the open list, and adds (V0, 0) to the close list. In this case, the open list contains (V2, 10), (V4, 30), (V5, 100), and the close list contains (V0, 0).

The smallest V2 is selected from the open list and added to the close list. The terminal device adds vertices adjacent to V2 to the open list and adjusts distances from each vertex to V0. In this case, the open list contains (V1, 15), (V4, 30), (V3, 60), and (V5, 100), and the close list contains (V0, 0) and (V2, 10).

Because V1 is already a boundary vertex, V1 is deleted from the open list. The smallest V4 is selected from the open list and added to the close list. The terminal device adds vertices adjacent to V4 to the open list and adjusts distances from each vertex to V0. In this case, the open list contains (V3, 50), (V5, 90), (V5, 100), and the close list contains (V0, 0), (V2, 10), and (V4, 30).

The smallest V3 is selected from the open list and added to the close list. The terminal device adds vertices adjacent to V3 to the open list and adjusts distances from each vertex to V0. In this case, the open list contains (V5, 60), and the close list contains (V0, 0), (V2, 10), (V4, 30), and (V3, 50).

V5 is selected from the open list and added to the close list. In this case, the open list is an empty set, and the close list contains (V0, 0), (V2, 10), (V4, 30), (V3, 50), and (V5, 60).

So far, it is determined that a road network path distance from the vertex V0 to the vertex V5 is 60, and a corresponding path is V0→V2→V4→V3→V5.

Whether by using the A* search algorithm or the Dijkstra algorithm, a shortest path distance (road network path distance) between two points is determined according to a topology map. For the road network data set, an intersection of two roads corresponds to a vertex of the topology map, and a distance between the roads correspond to a weight between two vertices in the topological map. In this way, a corresponding topological map may be generated from the road network data set, and the road network path distance may be further determined based on a path planning algorithm.

Step S306. Determine the candidate point as the reachable candidate point when the road network path distance between the candidate point and the start position is less than or equal to the remaining mileage parameter.

Candidate points with road network path distances from the start position less than or equal to the remaining mileage parameter are used as reachable candidate points; and correspondingly, candidate points with road network path distances from the start position greater than the remaining mileage parameter are filtered out.

Step S307. Determine the reachable candidate points as target points, and connect the plurality of target points on the map display interface, to obtain the target travel range.

For a specific process of step S307, reference may be made to the description of steps S203 and S204 in the foregoing embodiment corresponding to FIG. 3*b*, and details are not described herein again.

Step S308. Display the target travel range on the map display interface.

For a specific process of step S308, reference may be made to the description of step S104 in the foregoing embodiment corresponding to FIG. 3*a*, and details are not described herein again.

Figure 11B:
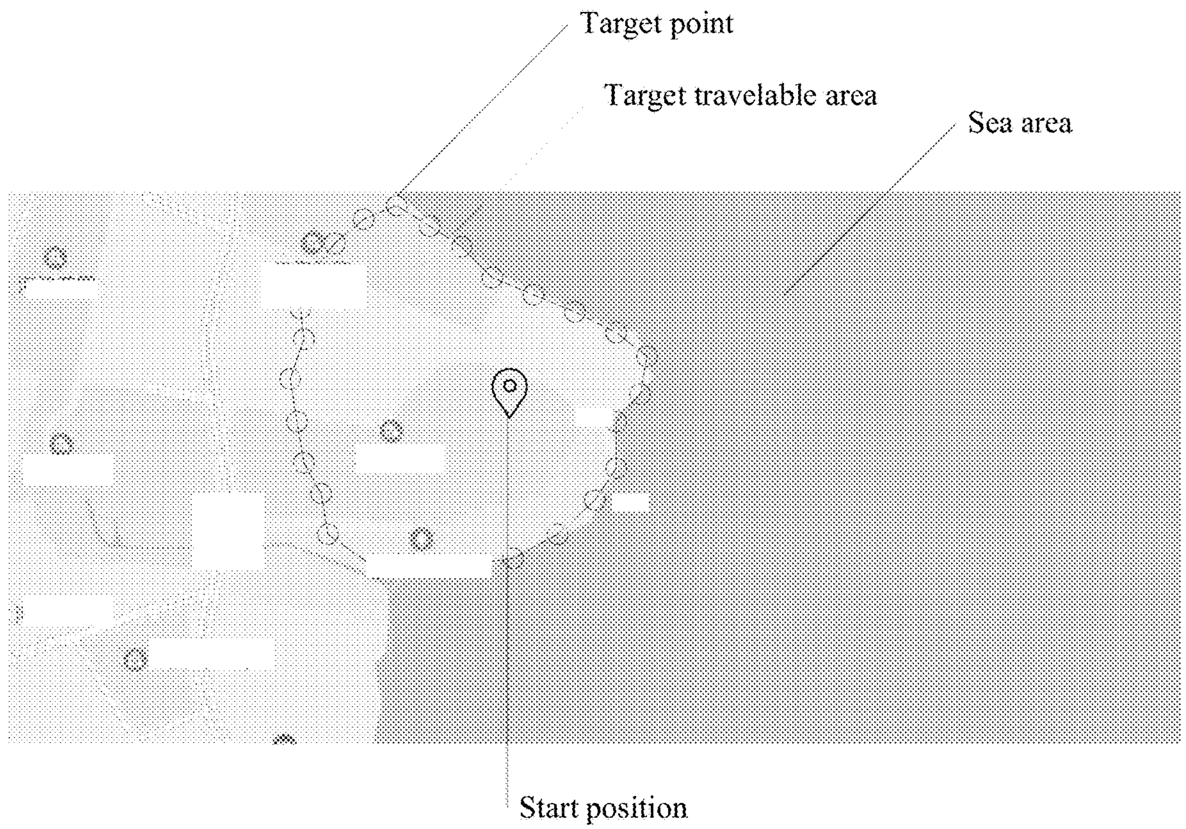
FIG. 11*b* is a schematic diagram of a target travel range according to an embodiment of this application.

FIG. 11*b* is a schematic diagram of a target travel range according to an embodiment of this application. It can be seen from FIG. 11*b* that a start position of the vehicle is very close to a sea area. Therefore, when the terminal device selects the reachable candidate points reachable by the vehicle from the plurality of original candidate points, original candidate points in the sea area are determined as points not reachable by the vehicle, so that the original candidate points in the sea area are filtered out, and the remaining original candidate points reachable by the vehicle may be used as the reachable candidate points. Further, after the reachable candidate points are determined, for each unit original travel range, the terminal device may use a reachable candidate point with a largest distance from the start position as a target point. Finally, the terminal device connects all target points on the map display interface in a clockwise sequence or a counterclockwise sequence, and an obtained area is a target travel range.

Compared to manually estimating a target travel range according to a remaining mileage and a current road condition, automatically determining the target travel range on a map interface can more intuitively show an estimated reachable range of a car to a user, thereby improving the efficiency of subsequent route planning. Further, the target travel range determined in this embodiment of this application is formed by a plurality of reachable points with largest distances from the start point, so that the target travel range has a high accuracy.

Figure 12:
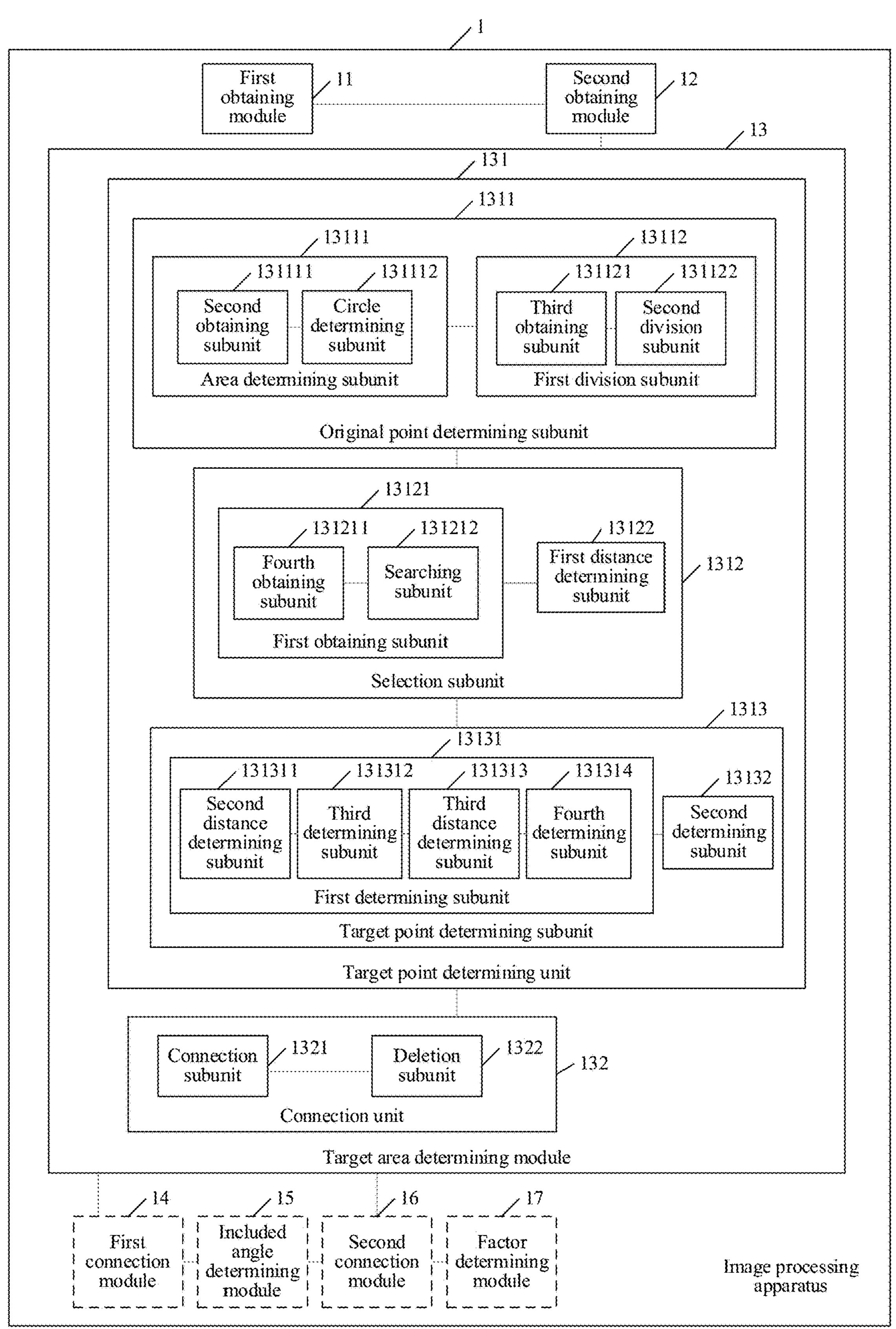
FIG. 12 is a schematic structural diagram of an image processing apparatus according to an embodiment of this application.

In addition, FIG. 12 is a schematic structural diagram of an image processing apparatus according to an embodiment of this application. As shown in FIG. 12, an image processing apparatus 1 may be applied to the terminal device in the foregoing embodiments corresponding to FIG. 3*a* to FIG. 11*b*. The image processing apparatus 1 may include: a first obtaining module 11, a second obtaining module 12, and a target area determining module 13.

The first obtaining module 11 is configured to obtain a remaining mileage parameter of a vehicle.

The second obtaining module 12 is configured to obtain a start position of the vehicle on a map display interface.

The target area determining module 13 is configured to determine a target travel range on the map display interface according to the start position and the remaining mileage parameter.

The first obtaining module 11 is further configured to display the target travel range on the map display interface.

For a specific functional implementation of the first obtaining module 11, the second obtaining module 12, and the target area determining module 13, reference may be made to steps S101 to S104 in the foregoing embodiment corresponding to FIG. 3*a*, and details are not described herein again.

Referring to FIG. 12, the target area determining module 13 may include a target point determining unit 131 and a connection unit 132.

The target point determining unit 131 is configured to determine a plurality of target points on the map display interface according to the start position and the remaining mileage parameter.

The connection unit 132 is configured to connect the plurality of target points on the map display interface, to obtain the target travel range.

For a specific functional implementation of the target point determining unit 131 and the connection unit 132, reference may be made to step S103 in the foregoing embodiment corresponding to FIG. 3*a*, and details are not described herein again.

Referring to FIG. 12, the target point determining unit 131 may include an original point determining subunit 1311, a selection subunit 1312, and a target point determining subunit 1313.

The original point determining subunit 1311 is configured to determine a plurality of original candidate points according to the start position and the remaining mileage parameter.

The selection subunit 1312 is configured to select original candidate points reachable by the vehicle from the plurality of original candidate points as reachable candidate points.

The target point determining subunit 1313 is configured to determine the reachable candidate points as target points.

For a specific implementation of functions of the original point determining subunit 1311, the selection subunit 1312, and the target point determining subunit 1313, reference may be made to steps S201 to S203 in the foregoing embodiment corresponding to FIG. 3*b*, and details are not described herein again.

Referring to FIG. 12, the original point determining subunit 1311 may include an area determining subunit 13111 and a first division subunit 13112.

The area determining subunit 13111 is configured to determine an original travel range on the map display interface according to the start position and the remaining mileage parameter.

The first division subunit 13112 is configured to divide the original travel range into at least one unit original travel range, and respectively determine original candidate points in each unit original travel range.

For a specific functional implementation of the area determining subunit 13111 and the first division subunit 13112, reference may be made to step S202 in the foregoing embodiment corresponding to FIG. 3*b*, and details are not described herein again.

Referring to FIG. 12, the target point determining subunit 1313 may include: a first determining subunit 13131 and a second determining subunit 13132.

The first determining subunit 13131 is configured to select from the reachable candidate points in each unit original travel range, a reachable candidate point with a largest distance from the start position as a to-be-determined target point corresponding to each unit original travel range.

The second determining subunit 13132 is configured to use to-be-determined target points corresponding to all unit original travel ranges as the target points.

For a specific function implementation of the first determining subunit 13131 and the second determining subunit 13132, reference may be made to step S203 in the foregoing embodiment corresponding to FIG. 3*b*, and details are not described herein again.

Referring to FIG. 12, the selection subunit 1312 may include a first obtaining subunit 13121 and a first distance determining subunit 13122.

The first obtaining subunit 13121 is configured to determine candidate point road network areas of each original candidate point.

The first distance determining subunit 13122 is configured to obtain road network data in the candidate point road network areas from a road network data set as candidate point road network data.

The first distance determining subunit 13122 is further configured to determine the original candidate point as a candidate point when the candidate point road network data is a nonempty set.

The first distance determining subunit 13122 is further configured to determine a road network path distance between the candidate point and the start position according to the road network data set.

The first distance determining subunit 13122 is further configured to determine the candidate point as the reachable candidate point when the road network path distance between the candidate point and the start position is less than or equal to the remaining mileage parameter.

For a specific functional implementation of the first obtaining subunit 13121 and the first distance determining subunit 13122, reference may be made to steps S303 to S306 in the foregoing embodiment corresponding to FIG. 7, and details are not described herein again.

Referring to FIG. 12, the area determining subunit 13111 may include a second obtaining subunit 131111 and a circle determining subunit 131112.

The second obtaining subunit 131111 is configured to obtain a map scale factor corresponding to the map display interface.

The second obtaining subunit 131111 is further configured to determine a mileage radius factor according to the remaining mileage parameter and the map scale factor.

The circle determining subunit 131112 is configured to generate a mileage circle on the map display interface by using the start position as a center of a circle and the mileage radius factor as a radius, and determine an area corresponding to the mileage circle on the map display interface as the original travel range.

For a specific function implementation of the second obtaining subunit 131111 and the circle determining subunit 131112, reference may be made to step S201 in the foregoing embodiment corresponding to FIG. 3*b*, and details are not described herein again.

Referring to FIG. 12, the first division subunit 13112 may include a third obtaining subunit 131121 and a second division subunit 131122.

The third obtaining subunit 131121 is configured to obtain a polar angle separation factor, and divide the original travel range in to the at least one unit original travel range according to the polar angle separation factor.

The second division subunit 131122 is configured to divide each unit original travel range into at least one unit original travel sub-range, a difference between a side length of each unit original travel sub-range and a first length threshold being less than a difference threshold.

The second division subunit 131122 is configured to use a vertex of each unit original travel sub-range as the original candidate point on the map display interface.

For a specific function implementation of the third obtaining subunit 131121 and the second division subunit 131122, reference may be made to step S201 in the foregoing embodiment corresponding to FIG. 3*b*, and details are not described herein again.

Referring to FIG. 12, the first obtaining subunit 13121 may include a fourth obtaining subunit 131211 and a searching subunit 131212.

The fourth obtaining subunit 131211 is configured to obtain latitude and longitude information of the original candidate point, and search a target road network data block corresponding to the latitude and longitude information from a plurality of road network data blocks, the road network data set corresponding to the plurality of road network data blocks, and each road network data block including a plurality of unit road network data blocks.

The searching subunit 131212 is configured to search a first unit road network data block corresponding to the latitude and longitude information from a plurality of unit road network data blocks corresponding to the target road network data block.

The fourth obtaining subunit 131211 is configured to obtain a second length threshold, and determine a second unit road network data block adjacent to the first unit road network data block according to the second length threshold.

The fourth obtaining subunit 131211 is further configured to use a road network area corresponding to the first unit road network data block and a road network area corresponding to the second unit road network data block as the candidate point road network areas of the original candidate point.

For a specific function implementation of the fourth obtaining subunit 131211 and the searching subunit 131212, reference may be made to step S303 in the foregoing embodiment corresponding to FIG. 7, and details are not described herein again.

Referring to FIG. 12, the first determining subunit 13131 may include a second distance determining subunit 131311 and a third determining subunit 131312.

The second distance determining subunit 131311 is configured to determine map distances between the reachable candidate points in each unit original travel range and the start position on the map display interface.

The third determining subunit 131312 is configured to use a reachable candidate point with a largest map distance as the to-be-determined target point corresponding to each unit original travel range.

For a specific function implementation of the second distance determining subunit 131311 and the third determining subunit 131312, reference may be made to step S203 in the foregoing embodiment corresponding to FIG. 3*b*, and details are not described herein again.

Referring to FIG. 12, the first determining subunit 13131 may further include a third distance determining subunit 131313 and a fourth determining subunit 131314.

The third distance determining subunit 131313 is configured to determine road network path distances between the reachable candidate points in each unit original travel range and the start position as candidate road network path distances.

The fourth determining subunit 131314 is configured to use a reachable candidate point with a largest candidate road network path distance as the to-be-determined target point corresponding to each unit original travel range.

For a specific function implementation of the third distance determining subunit 131313 and the fourth determining subunit 131314, reference may be made to step S303 in the foregoing embodiment corresponding to FIG. 7, and details are not described herein again.

Referring to FIG. 12, the connection unit 132 may include a connection subunit 1321 and a deletion subunit 1322.

The connection subunit 1321 is configured to connect each of the target points in a clockwise sequence or a counterclockwise sequence to obtain a candidate closed circle.

The deletion subunit 1322 is configured to delete target points meeting a position sudden change condition from the candidate closed circle.

The connection subunit 1321 is further configured to connect remaining target points in the clockwise sequence or the counterclockwise sequence on the map display interface, to obtain the target travel range.

For a specific function implementation of the connection subunit 1321 and the deletion subunit 1322, reference may be made to step S204 in the foregoing embodiment corresponding to FIG. 3*b*, and details are not described herein again.

Referring to FIG. 12, the target points include a first reachable point, a second reachable point, and a third reachable point; in the candidate closed circle, the second reachable point is adjacent to the first reachable point, and the second reachable point is adjacent to the third reachable point.

The image processing apparatus 1 may include the first obtaining module 11, the second obtaining module 12, and the target area determining module 13, and may further include a first connection module 14 and an included angle determining module 15.

The first connection module 14 is configured to connect the first reachable point and the second reachable point to obtain a first connection line.

The first connection module 14 is further configured to connect the second reachable point and the third reachable point to obtain a second connection line.

The included angle determining module 15 is configured to determine a connection line included angle according to the first connection line and the second connection line, and determine the second reachable point as a target point meeting the position sudden change condition when the connection line included angle is less than an included angle threshold.

For a specific function implementation of the first connection module 14 and the included angle determining module 15, reference may be made to step S204 in the foregoing embodiment corresponding to FIG. 3*b*, and details are not described herein again.

Referring to FIG. 12, the target points include a first reachable point, a second reachable point, and a third reachable point; in the candidate closed circle, the second reachable point is adjacent to the first reachable point, and the second reachable point is adjacent to the third reachable point.

The image processing apparatus 1 may include the first obtaining module 11, the second obtaining module 12, the target area determining module 13, the first connection module 14, and the included angle determining module 15, and may further include a second connection module 16 and a factor determining module 17.

The second connection module 16 is configured to connect the first reachable point and the third reachable point to obtain a third connection line.

The factor determining module 17 is configured to determine a connection line distance between the second reachable point and the third connection line, and generate a connection line scale factor according to the connection line distance and a length of the third connection line.

The factor determining module 17 is further configured to determine the second reachable point as a target point meeting the position sudden change condition when the connection line scale factor is greater than a scale factor threshold.

For a specific function implementation of the second connection module 16 and the factor determining module 17, reference may be made to step S204 in the foregoing embodiment corresponding to FIG. 3*b*, and details are not described herein again.

Compared to manually estimating a target travel range according to a remaining mileage and a current road condition, automatically determining the target travel range on a map interface can more intuitively show an estimated reachable range of a car to a user, thereby improving the efficiency of subsequent route planning. Further, the target travel range determined in this embodiment of this application is formed by a plurality of reachable points with largest distances from the start point, so that the target travel range has a high accuracy.

Figure 13:
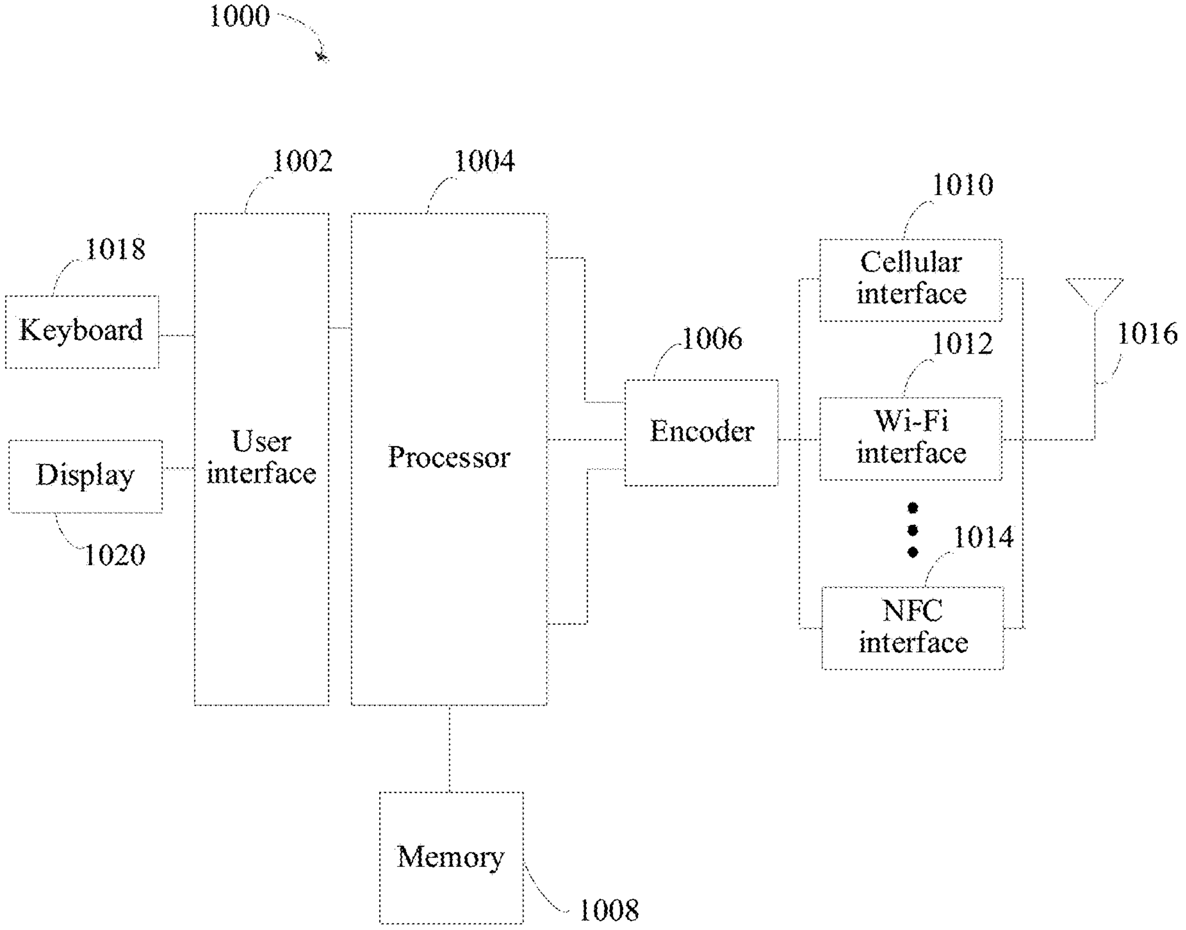
FIG. 13 is a schematic structural diagram of an electronic device according to an embodiment of this application.

Further, FIG. 13 is a schematic structural diagram of an electronic device according to an embodiment of this application. An electronic device 1000 shown in FIG. 13 may be the terminal device in the foregoing embodiments corresponding to FIG. 3*a* to FIG. 11*b*. As shown in FIG. 13, the electronic device 1000 may include a user interface 1002, a processor 1004, an encoder 1006, and a memory 1008. A signal receiver 1016 is configured to receive or transmit data via a cellular interface 1010, a Wi-Fi interface 1012, . . . , or an NFC interface 1014. The encoder 1006 encodes received data into a data format processed by a computer. The memory 1008 stores a computer program, and the processor 1004 is configured to perform steps in any one of the method embodiments by using the computer program. The memory 1008 may include a volatile memory (for example, a dynamic random access memory (DRAM)), and may further include a non-volatile memory (for example, a one-time programmable read-only memory (OTPROM)). In some instances, the memory 1008 may further include memories remotely disposed relative to the processor 1004, and these remote memories may be connected to the electronic device 1000 through a network. The user interface 1002 may include a keyboard 1018 and a display 1020.

In the electronic device 1000 shown in FIG. 13, the processor 1004 may be configured to invoke the computer program stored in the memory 1008, to implement the following steps:

- obtaining a remaining mileage parameter of a vehicle;
- obtaining a start position of the vehicle on a map display interface;
- determining a target travel range on the map display interface according to the start position and the remaining mileage parameter; and
- displaying the target travel range on the map display interface.

In an embodiment, when determining a target travel range on the map display interface according to the start position and the remaining mileage parameter, the processor 1004 specifically performs the following steps:

- determining a plurality of target points on the map display interface according to the start position and the remaining mileage parameter; and
- connecting the plurality of target points on the map display interface, to obtain the target travel range.

In an embodiment, when determining a plurality of target points on the map display interface according to the start position and the remaining mileage parameter, the processor 1004 specifically performs the following steps:

- determining a plurality of original candidate points according to the start position and the remaining mileage parameter;
- selecting original candidate points reachable by the vehicle from the plurality of original candidate points as reachable candidate points; and
- determining the reachable candidate points as target points.

In an embodiment, when determining a plurality of original candidate points according to the start position and the remaining mileage parameter, the processor 1004 specifically performs the following steps:

- determining an original travel range on the map display interface according to the start position and the remaining mileage parameter; and
- dividing the original travel range into at least one unit original travel range, and respectively determining original candidate points in each unit original travel range.

In an embodiment, when determining the reachable candidate points as target points, the processor 1004 specifically performs the following steps:

- selecting, from the reachable candidate points in each unit original travel range, a reachable candidate point with a largest distance from the start position as a to-be-determined target point corresponding to each unit original travel range; and using to-be-determined target points corresponding to all unit original travel ranges as the target points.

In an embodiment, when selecting original candidate points reachable by the vehicle from the plurality of original candidate points as reachable candidate points, the processor 1004 specifically performs the following steps:

determining candidate point road network areas of each original candidate point, and obtaining road network data in the candidate point road network areas from a road network data set as candidate point road network data;

determining the original candidate point as a candidate point when the candidate point road network data is a nonempty set;

determining a road network path distance between the candidate point and the start position according to the road network data set; and determining the candidate point as the reachable candidate point when the road network path distance between the candidate point and the start position is less than or equal to the remaining mileage parameter.

In an embodiment, when determining an original travel range on the map display interface according to the start position and the remaining mileage parameter, the processor 1004 specifically performs the following steps:

obtaining a map scale factor corresponding to the map display interface;

determining a mileage radius factor according to the remaining mileage parameter and the map scale factor; and generating a mileage circle on the map display interface by using the start position as a center of a circle and the mileage radius factor as a radius, and determining an area corresponding to the mileage circle on the map display interface as the original travel range.

In an embodiment, when dividing the original travel range into at least one unit original travel range, and respectively determining original candidate points in each unit original travel range, the processor 1004 specifically performs the following steps:

obtaining a polar angle separation factor, and dividing the original travel range in to the at least one unit original travel range according to the polar angle separation factor;

dividing each unit original travel range into at least one unit original travel sub-range, a difference between a side length of each unit original travel sub-range and a first length threshold being less than a difference threshold; and using a vertex of each unit original travel sub-range as the original candidate point on the map display interface.

In an embodiment, when determining candidate point road network areas of each original candidate point, the processor 1004 specifically performs the following steps:

obtaining latitude and longitude information of the original candidate point, and searching a target road network data block corresponding to the latitude and longitude information from a plurality of road network data blocks, the road network data set corresponding to the plurality of road network data blocks, and each road network data block including a plurality of unit road network data blocks;

searching a first unit road network data block corresponding to the latitude and longitude information from a plurality of unit road network data blocks corresponding to the target road network data block;

obtaining a second length threshold, and determining a second unit road network data block adjacent to the first unit road network data block according to the second length threshold; and using a road network area corresponding to the first unit road network data block and a road network area corresponding to the second unit road network data block as the candidate point road network areas of the original candidate point.

In an embodiment, when selecting, from the reachable candidate points in each unit original travel range, a reachable candidate point with a largest distance from the start position as a to-be-determined target point corresponding to each unit original travel range, the processor 1004 specifically performs the following steps:

determining map distances between the reachable candidate points in each unit original travel range and the start position on the map display interface; and using a reachable candidate point with a largest map distance as the to-be-determined target point corresponding to each unit original travel range.

In an embodiment, when selecting, from the reachable candidate points in each unit original travel range, a reachable candidate point with a largest distance from the start position as a to-be-determined target point corresponding to each unit original travel range, the processor 1004 specifically performs the following steps:

determining road network path distances between the reachable candidate points in each unit original travel range and the start position as candidate road network path distances; and using a reachable candidate point with a largest candidate road network path distance as the to-be-determined target point corresponding to each unit original travel range.

In an embodiment, when connecting the plurality of target points on the map display interface, to obtain the target travel range, the processor 1004 specifically performs the following steps:

connecting each of the target points in a clockwise sequence or a counterclockwise sequence to obtain a candidate closed circle;

deleting target points meeting a position sudden change condition from the candidate closed circle; and connecting remaining target points in the clockwise sequence or the counterclockwise sequence on the map display interface, to obtain the target travel range.

In an embodiment, the target points include a first reachable point, a second reachable point, and a third reachable point; in the candidate closed circle, the second reachable point is adjacent to the first reachable point, and the second reachable point is adjacent to the third reachable point; and the processor 1004 further performs the following steps:

connecting the first reachable point and the second reachable point to obtain a first connection line;

connecting the second reachable point and the third reachable point to obtain a second connection line; and determining a connection line included angle according to the first connection line and the second connection line, and determining the second reachable point as a target point meeting the position sudden change condition when the connection line included angle is less than an included angle threshold.

In an embodiment, the target points include a first reachable point, a second reachable point, and a third reachable point; in the candidate closed circle, the second reachable point is adjacent to the first reachable point, and the second reachable point is adjacent to the third reachable point.

The processor 1004 further performs the following steps:

connecting the first reachable point and the third reachable point to obtain a third connection line;

determining a connection line distance between the second reachable point and the third connection line, and generating a connection line scale factor according to the connection line distance and a length of the third connection line; and determining the second reachable point as a target point meeting the position sudden change condition when the connection line scale factor is greater than a scale factor threshold.

It is to be understood that the electronic device 1000 described in this embodiment of this application may implement the descriptions of the image processing method in the embodiments corresponding to FIG. 3*a* to FIG. 11*b*, or the descriptions of the image processing apparatus 1 in the embodiment corresponding to FIG. 12. Details are not described herein again. In addition, the description of beneficial effects of the same method are not described herein again.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In addition, an embodiment of this application further provides a computer storage medium. The computer storage medium stores a computer program executed by the image processing apparatus 1 mentioned above, and the computer program includes a program instruction. When executing the program instruction, the processor can implement the descriptions of the image processing method in the embodiments corresponding to FIG. 3*a* to FIG. 11*b*. Therefore, details are not described herein again. In addition, the description of beneficial effects of the same method are not described herein again. For technical details that are not disclosed in the computer storage medium embodiments of this application, refer to the descriptions of the method embodiments of this application.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The foregoing disclosure merely presents embodiments of this application, and certainly is not intended to limit the protection scope of this application. Therefore, equivalent variations made in accordance with the claims of this application shall fall within the scope of this application.

What is claimed is:

1. An image processing method, performed by an electronic device, the method comprising:

starting an application program on the electronic device, and playing a startup animation on a display screen coupled to the electronic device;

at the same time of playing the startup animation, determining a target travel range, comprising:

receiving a remaining mileage parameter of a vehicle coupled to the electronic device;

obtaining a start position of the vehicle on a map display interface;

determining an original travel range on the map display interface according to the start position and the remaining mileage parameter;

dividing the original travel range into at least one unit original travel range, and respectively determining candidate points in each unit original travel range, wherein a distance between neighboring points of the candidate points on an inner concentric circle in the original travel range is less than a distance between neighboring points of the candidate points on an outer concentric circle in the original travel range;

identifying and removing, from the candidate points, a candidate point within a unit original travel subrange located in the inner concentric circle of the original travel range, to obtain original candidate points, to make a distance between the neighboring points of the original candidate points on the inner concentric circle being approximately equal to a distance between the neighboring points of the original candidate points on the outer concentric circle; and determining the target travel range on the map display interface according to the original candidate points, the start position and the remaining mileage parameter; and stopping displaying the startup animation, and displaying, on the display screen, the map display interface that comprises the target travel range.

2. The method according to claim 1, wherein the determining a target travel range on the map display interface comprises:

determining a plurality of target points on the map display interface according to the candidate points; and connecting the plurality of target points on the map display interface, to obtain the target travel range.

3. The method according to claim 2, wherein the connecting the plurality of target points on the map display interface, to obtain the target travel range comprises:

connecting each of the target points in a clockwise sequence or a counterclockwise sequence to obtain a candidate closed circle;

deleting target points meeting a position sudden change condition from the candidate closed circle; and connecting remaining target points in the clockwise sequence or the counterclockwise sequence on the map display interface, to obtain the target travel range.

4. The method according to claim 3, wherein the target points comprise a first reachable point, a second reachable point, and a third reachable point; in the candidate closed circle, the second reachable point is adjacent to the first reachable point, and the second reachable point is adjacent to the third reachable point; and the method further comprises:

connecting the first reachable point and the second reachable point to obtain a first connection line;

connecting the second reachable point and the third reachable point to obtain a second connection line; and determining a connection line angle according to the first connection line and the second connection line, and determining the second reachable point as a target point meeting the position sudden change condition when the connection line angle is less than an included angle threshold.

5. The method according to claim 3, wherein the target points comprise a first reachable point, a second reachable point, and a third reachable point; in the candidate closed circle, the second reachable point is adjacent to the first reachable point, and the second reachable point is adjacent to the third reachable point; and the method further comprises:

connecting the first reachable point and the third reachable point to obtain a third connection line;

determining a connection line distance between the second reachable point and the third connection line, and generating a connection line scale factor according to the connection line distance and a length of the third connection line; and identifying the second reachable point as a target point meeting the position sudden change condition when the connection line scale factor is greater than a scale factor threshold.

6. The method according to claim 2, wherein the determining a plurality of target points on the map display interface comprises:

determining a plurality of original candidate points according to the start position and the remaining mileage parameter;

selecting original candidate points reachable by the vehicle as reachable candidate points; and determining the reachable candidate points as target points.

7. The method according to claim 6, wherein the determining the reachable candidate points as target points comprises:

selecting, from the reachable candidate points in each unit original travel range, a reachable candidate point with a largest distance from the start position as a to-be-determined target point corresponding to each unit original travel range; and identifying to-be-determined target points corresponding to all unit original travel ranges as the target points.

8. The method according to claim 7, wherein the selecting, from the reachable candidate points in each unit original travel range, a reachable candidate point with a largest distance from the start position as a to-be-determined target point corresponding to each unit original travel range comprises:

determining map distances between the reachable candidate points in each unit original travel range and the start position on the map display interface; and identifying a reachable candidate point with a largest map distance as the to-be-determined target point corresponding to each unit original travel range.

9. The method according to claim 7, wherein the selecting, from the reachable candidate points in each unit original travel range, a reachable candidate point with a largest distance from the start position as a to-be-determined target point corresponding to each unit original travel range comprises:

determining road network path distances between the reachable candidate points in each unit original travel range and the start position as candidate road network path distances; and identifying a reachable candidate point with a largest candidate road network path distance as the to-be-determined target point corresponding to each unit original travel range.

10. The method according to claim 6, wherein the selecting original candidate points reachable by the vehicle from the plurality of original candidate points as reachable candidate points comprises:

determining candidate point road network areas of each original candidate point, and obtaining candidate point road network data corresponding to the candidate point road network areas from a road network data set;

determining the original candidate point as a candidate point when the candidate point road network data is a nonempty set;

determining a road network path distance between the candidate point and the start position according to the road network data set; and determining the candidate point as the reachable candidate point when the road network path distance between the candidate point and the start position is less than or equal to the remaining mileage parameter.

11. The method according to claim 10, wherein the determining candidate point road network areas of each original candidate point comprises:

obtaining latitude and longitude information of the original candidate point, and searching a target road network data block corresponding to the latitude and longitude information from a plurality of road network data blocks, the road network data set corresponding to the plurality of road network data blocks, and each road network data block comprising a plurality of unit road network data blocks;

identifying a first unit road network data block corresponding to the latitude and longitude information from a plurality of unit road network data blocks corresponding to the target road network data block;

obtaining a second length threshold, and determining a second unit road network data block adjacent to the first unit road network data block according to the second length threshold; and identifying a road network area corresponding to the first unit road network data block and a road network area corresponding to the second unit road network data block as the candidate point road network areas of the original candidate point.

12. The method according to claim 1, wherein the determining an original travel range on the map display interface according to the start position and the remaining mileage parameter comprises:

obtaining a map scale factor corresponding to the map display interface;

determining a mileage radius factor according to the remaining mileage parameter and the map scale factor; and generating a mileage circle on the map display interface by using the start position as a center of a circle and the mileage radius factor as a radius, and determining an area corresponding to the mileage circle on the map display interface as the original travel range.

13. The method according to claim 1, wherein the dividing the original travel range into at least one unit original travel range, and respectively determining original candidate points in each unit original travel range comprises:

obtaining a polar angle separation factor, and dividing the original travel range in to the at least one unit original travel range according to the polar angle separation factor;

dividing each unit original travel range into at least one unit original travel sub-range, a difference between a side length of each unit original travel sub-range and a first length threshold being less than a difference threshold; and identifying a vertex of each unit original travel sub-range as the original candidate point on the map display interface.

14. The method according to claim 1, wherein the electronic device is a user terminal that has a binding relationship with the vehicle.

15. The method according to claim 1, wherein the electronic device is a server that established a connection with the vehicle through a communication bus, and the remaining mileage parameter of the vehicle is transmitted by the vehicle through the communication bus.

16. An image processing apparatus, comprising a processor and a memory, the processor being connected to the memory, the memory being configured to store a computer program, and the processor being configured to invoke the computer program to:

starting an application program on the image processing apparatus, and playing a startup animation on a display screen coupled to the image processing apparatus;

at the same time of playing the startup animation, determine a target travel range, comprising:

receiving a remaining mileage parameter of a vehicle coupled to the image processing apparatus;

obtaining a start position of the vehicle on a map display interface;

determining an original travel range on the map display interface according to the start position and the remaining mileage parameter;

dividing the original travel range into at least one unit original travel range, and respectively determining candidate points in each unit original travel range, wherein a distance between neighboring points of the candidate points on an inner concentric circle in the original travel range is less than a distance between neighboring points of the candidate points on an outer concentric circle in the original travel range;

identifying and removing, from the candidate points, a candidate point within a unit original travel sub-range located in the inner concentric circle of the original travel range, to obtain original candidate points, to make a distance between the neighboring points of the original candidate points on the inner concentric circle being approximately equal to a distance between the neighboring points of the original candidate points on the outer concentric circle; and determining the target travel range on the map display interface according to the original candidate points, the start position and the remaining mileage parameter; and stop displaying the startup animation, and display, on the display screen, the map display interface that comprises the target travel range.

17. The apparatus according to claim 16, wherein the processor is further configured to:

determine a plurality of target points on the map display interface according to the candidate points; and connect the plurality of target points on the map display interface, to obtain the target travel range.

18. The apparatus according to claim 17, wherein the processor is further configured to:

determine a plurality of original candidate points according to the start position and the remaining mileage parameter;

select original candidate points reachable by the vehicle from the plurality of original candidate points as reachable candidate points; and determine the reachable candidate points as target points.

19. A non-transitory computer storage medium, storing a computer program, the computer program comprising program instructions, the program instructions, when executed by a processor, causing the processor of an electronic device to perform:

starting an application program on the electronic device, and playing a startup animation on a display screen coupled to the electronic device;

at the same time of playing the startup animation, determining a target travel range, comprising:

receiving a remaining mileage parameter of a vehicle coupled to the electronic device;

obtaining a start position of the vehicle on a map display interface;

determining an original travel range on the map display interface according to the start position and the remaining mileage parameter;

dividing the original travel range into at least one unit original travel range, and respectively determining candidate points in each unit original travel range, wherein a distance between neighboring points of the candidate points on an inner concentric circle in the original travel range is less than a distance between neighboring points of the candidate points on an outer concentric circle in the original travel range;

identifying and removing, from the candidate points, a candidate point within a unit original travel sub-range located in the inner concentric circle of the original travel range, to obtain original candidate points, to make a distance between the neighboring points of the original candidate points on the inner concentric circle being approximately equal to a distance between the neighboring points of the original candidate points on the outer concentric circle; and determining the target travel range on the map display interface according to the original candidate points, the start position and the remaining mileage parameter; and stopping displaying the startup animation, and displaying, on the display screen, the map display interface that comprises the target travel range.

20. The computer storage medium according to claim 19, wherein the determining a target travel range on the map display interface comprises:

determining a plurality of target points on the map display interface according to the candidate points; and connecting the plurality of target points on the map display interface, to obtain the target travel range.

* * * * *